United States Patent
Shen et al.

(10) Patent No.: US 7,117,290 B2
(45) Date of Patent: Oct. 3, 2006

(54) MICROTLB AND MICRO TAG FOR REDUCING POWER IN A PROCESSOR

(75) Inventors: Gene W. Shen, San Jose, CA (US); S. Craig Nelson, San Jose, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 477 days.

(21) Appl. No.: 10/653,749

(22) Filed: Sep. 3, 2003

(65) Prior Publication Data

US 2005/0050277 A1  Mar. 3, 2005

(51) Int. Cl.
*G06F 12/08* (2006.01)

(52) U.S. Cl. .......................... 711/3; 711/207
(58) Field of Classification Search .............. 711/3, 711/118, 207
See application file for complete search history.

(56) References Cited

U.S. PATENT DOCUMENTS

| | | | |
|---|---|---|---|
| 4,044,338 A | 8/1977 | Wolf | |
| 4,453,212 A | 6/1984 | Gaither et al. | |
| 4,764,861 A | 8/1988 | Shibuya | |
| 4,807,115 A | 2/1989 | Torng | |
| 4,853,840 A | 8/1989 | Shibuya | |
| 4,858,105 A | 8/1989 | Kuriyama et al. | |
| 4,912,626 A | 3/1990 | Fiacconi | |
| 4,914,582 A | 4/1990 | Bryg et al. | |
| 4,928,223 A | 5/1990 | Dao et al. | |
| 4,943,908 A | 7/1990 | Emma et al. | |
| 4,984,154 A | 1/1991 | Hanatani et al. | |
| 5,053,631 A | 10/1991 | Perlman et al. | |
| 5,058,048 A | 10/1991 | Gupta et al. | |
| 5,091,851 A | 2/1992 | Shelton et al. | |
| 5,129,067 A | 7/1992 | Johnson | |
| 5,136,697 A | 8/1992 | Johnson | |
| 5,142,634 A | 8/1992 | Fite et al. | |
| 5,148,538 A | 9/1992 | Celtruda et al. | |
| 5,185,868 A | 2/1993 | Tran | |

(Continued)

FOREIGN PATENT DOCUMENTS

EP  0381471  8/1990

(Continued)

OTHER PUBLICATIONS

"Filtering Memory References to Increase Energy Efficiency," Kin, et al., IEEE Transactions on Computers, vol. 49, No. 1, Jan. 2000, 15 pages.

(Continued)

*Primary Examiner*—Hiep T. Nguyen
(74) *Attorney, Agent, or Firm*—Lawrence J. Merkel; Meyertons, Hood, Kivlin, Kowert & Goetzel, P.C.

(57) ABSTRACT

A processor comprises a cache, a first TLB, and a tag circuit. The cache comprises a data memory storing a plurality of cache lines and a tag memory storing a plurality of tags. Each of the tags corresponds to a respective one of the cache lines. The first TLB stores a plurality of page portions of virtual addresses identifying a plurality of virtual pages for which physical address translations are stored in the first TLB. The tag circuit is configured to identify one or more of the plurality of cache lines that are stored in the cache and are within the plurality of virtual pages. In response to a hit by a first virtual address in the first TLB and a hit by the first virtual address in the tag circuit, the tag circuit is configured to prevent a read of the tag memory in the cache.

20 Claims, 13 Drawing Sheets

U.S. PATENT DOCUMENTS

| | | | |
|---|---|---|---|
| 5,210,845 A | 5/1993 | Crawford et al. | |
| 5,226,126 A | 7/1993 | McFarland et al. | |
| 5,226,130 A | 7/1993 | Favor et al. | |
| 5,230,068 A | 7/1993 | Van Dyke et al. | |
| 5,235,697 A | 8/1993 | Steely, Jr. et al. | |
| 5,251,306 A | 10/1993 | Tran | |
| 5,283,873 A | 2/1994 | Steely, Jr. et al. | |
| 5,327,547 A | 7/1994 | Stiles et al. | |
| 5,345,569 A | 9/1994 | Tran | |
| 5,381,533 A | 1/1995 | Peleg et al. | |
| 5,412,787 A * | 5/1995 | Forsyth et al. | 711/207 |
| 5,418,922 A | 5/1995 | Liu | |
| 5,423,011 A | 6/1995 | Blaner et al. | |
| 5,454,117 A | 9/1995 | Puziol et al. | |
| 5,485,587 A | 1/1996 | Matsuo et al. | |
| 5,509,119 A | 4/1996 | La Fetra | |
| 5,530,958 A | 6/1996 | Agarwal et al. | |
| 5,559,975 A | 9/1996 | Christie et al. | |
| 5,619,676 A | 4/1997 | Fukuda et al. | |
| 5,640,532 A | 6/1997 | Thome et al. | |
| 5,651,125 A | 7/1997 | Witt et al. | |
| 5,671,444 A | 9/1997 | Akkary et al. | |
| 5,701,435 A | 12/1997 | Chi | |
| 5,752,069 A | 5/1998 | Roberts et al. | |
| 5,764,946 A | 6/1998 | Tran | |
| 5,802,594 A | 9/1998 | Wong et al. | |
| 5,813,031 A * | 9/1998 | Chou et al. | 711/122 |
| 5,835,951 A | 11/1998 | McMahan | |
| 5,845,323 A | 12/1998 | Roberts et al. | |
| 5,893,146 A | 4/1999 | Pickett | |
| 5,918,245 A | 6/1999 | Yung | |
| 5,953,748 A * | 9/1999 | Riordan | 711/207 |
| 5,956,746 A | 9/1999 | Wang | |
| 6,016,533 A | 1/2000 | Tran | |
| 6,016,545 A | 1/2000 | Mahalingaiah et al. | |
| 6,065,091 A * | 5/2000 | Green | 711/3 |
| 6,115,792 A | 9/2000 | Tran | |
| 6,138,225 A | 10/2000 | Upton et al. | |
| 6,212,602 B1 * | 4/2001 | Wicki et al. | 711/122 |
| 6,240,488 B1 | 5/2001 | Mowry | |
| 6,418,521 B1 | 7/2002 | Mathews et al. | |
| 6,425,055 B1 | 7/2002 | Sager et al. | |
| 6,553,477 B1 | 4/2003 | Krishna et al. | |
| 6,560,679 B1 | 5/2003 | Choi et al. | |
| 6,687,789 B1 | 2/2004 | Keller et al. | |

FOREIGN PATENT DOCUMENTS

| | | |
|---|---|---|
| EP | 0459232 | 12/1991 |
| EP | 0467152 | 1/1992 |
| EP | 0651321 | 5/1995 |
| EP | 0675443 | 10/1995 |
| EP | 0259095 | 3/1998 |
| FR | 2 674 044 | 9/1992 |
| GB | 2263985 | 8/1993 |
| GB | 2263987 | 8/1993 |
| GB | 2281422 | 3/1995 |
| WO | 98/20421 | 5/1998 |

OTHER PUBLICATIONS

"Reducing Set-Associative Cache Energy via Way-Prediction and Selective Direct-Mapping," Powell, et al., IEEE, 2001, pp. 54-64.

"Low Load Latency Through Sum-Addressed Memory (SAM)," Lynch, et al., Sun Microsystems, Inc., 6 pages.

"The 16kB Single-Cycle Read Access Cache on a Next-Generation 64b Itanium Microprocessor," ISSCC 2002, Session 6, SRAM and NON-Volatile Memories, 6.6, 2 pages.

XP 000525181 Calder, et al, "Next Cache Line and Set Prediction," Department of Computer Science, University of Colorado, 8345 Computer Architecture News, May 23, 1995, No. 2, pp. 287-296.

XP 000397920 Uchiyama, et al, "The Gmicro/500 Superscalar Microprocessor with Branch Buffers," 8207 IEEE Micro, Oct. 13, 1993, No. 5, pp. 12-22.

Intel, "Chapter 2: Microprocessor Architecture Overview," pp. 2-1 through 2-4, 1994.

Slater, M., "AMD's Microprocessor K5 designed to Outrun Pentium" (Microprocessor Report, vol. 8, No. 14, Oct. 24, 1994, 7 pages.

Rupley, et al, "P6: The Next Step?" PC Magazine, Sep. 12, 1995, 16 pages.

Halfhill, "AMD K6 Takes on Intel P6," BYTE Magazine, January 1996, 4 pages.

Patterson, et al, "Computer Architecture: A Quantitative Approach," Section 8.3, pp. 408-425, published by Morgan Kaufmann Publishers, Inc., 1990.

Holstad, S., "Tutprial Tuesday: Decoding MMX" Jan. 14, 1997, Earthlink Network, Inc. copyright 1997, 5 pages (see http://www.earthlink.net/dailey/Tuesday/MMX).

*"Intel Architecture Software Developer's Manual, vol. 1: Basic Architecture"*, Intel Corporation, Prospect IL, 1996, 1997, Chapter 8: Programming With The Intel MMX™ Technology, pp. 8-1 through 8-15.

"Intel MMX™ Technology—Frequently Asked Questions" 6 pages (see http://www.intel.com/drg/mmx/support/faq/htm).

Patent Abstracts of Japan, Publication No. 07334423, published Dec. 22, 1995.

Kessler et al., "Inexpensive Implementations of Set-Associativity," Computer Architecture Conference Proceedings, Jun. 1989, pp. 131-139.

PCT International Search Report for PCT/US2004/018042 dated Mar. 23, 2005.

Choi et al., "A Low Power TLB Structure for Embedded Systems," Computer Architecture Architecture Letters, vol. 1, Jan. 2002, (4 Pages).

Zhang et al., "Low Cost Instruction Cache Designs for Tag Comparison Elimination," Proceedings of the 2003 International Symposium on Lower Power Electronics and Design, ISLPED'03, Aug. 25, 2003, (pp. 266-269).

Lee et al., "A Selective Filter Bank TLB System," Proceedings of the 2003 International Symposium on Lower Power Electronics and Design, ISLPED'03, Aug. 25, 2003, (pp. 312-317).

Inoue et al., "A History-Based I-Cache for Low-Energy Multimedia Applications," Low Power Electronics and Design, ISPLED'02, Aug. 12, 2002, (pp. 148-153).

* cited by examiner

| 2M | match upper | match lower | Result |
|---|---|---|---|
| x | 0 | x | MicroTLB miss (and thus Micro Tag Miss) |
| 1 | 1 | 0 | MicroTLB hit 2M page, Micro Tag Miss |
| 1 | 1 | 1 | MicroTLB hit 2M page, Micro Tag Lookup |
| 0 | 1 | 0 | MicroTLB miss (and thus Micro Tag Miss) |
| 0 | 1 | 1 | MicroTLB hit 4k page, Micro Tag Lookup |

90

MICROTLB AND MICRO TAG FOR REDUCING POWER IN A PROCESSOR

BACKGROUND OF THE INVENTION

1. Field of the Invention

This invention is related to the field of processors and, more particularly, to caching structures in processors.

2. Description of the Related Art

Processors typically implement virtual addressing, and also typically implement caches for storing recently accessed data and/or instructions. Typically, the processor generates a virtual address of a location to be accessed (i.e. read or written), and the virtual address is translated to a physical address to determine if the access hits in the cache. More particularly, the cache access is typically started in parallel with the translation, and the translation is used to detect if the cache access is a hit.

The cache access is typically one of the critical timing paths in the processor, and cache latency is also typically critical to the performance level achievable by the processor. Accordingly, processor designers often attempt to optimize their cache/translation designs to reduce cache latency and to meet timing requirements. However, many of the optimization techniques may increase the power consumption of the cache/translation circuitry. In many processors, the cache/translation circuitry may be one of the largest contributors to the overall power consumption of the processor.

As power consumption in processors has increased over time, the importance of controlling processor power consumption (and designing processors for reduced power consumption) has increased. Since the cache/translation circuitry is often a major contributor to power consumption of a processor, techniques for reducing power consumption in the cache/translation circuitry have become even more desirable.

To improve performance, set associative caches are often implemented in processors. In a set associative cache, a given address indexing into the cache selects a set of two or more cache line storage locations which may be used to store the cache line indicated by that address. The cache line storage locations in the set are referred to as the ways of the set, and a cache having W ways is referred to as W-way set associative (where W is an integer greater than one). Set associative caches typically have higher hit rates than direct-mapped caches of the same size, and thus may provide higher performance than direct-mapped caches. However, conventional set associative caches may also typically consume more power than direct-mapped caches of the same size. Generally, the cache includes a data memory storing the cached data and a tag memory storing a tag identifying the address of the cached data.

In a conventional set associative cache, each way of the data memory and the tag memory is accessed in response to an input address. The tags corresponding to each way in the set may be compared to determine which way is hit by the address (if any), and the data from the corresponding way is selected for output by the cache. Thus, each way of the data memory and the tag memory may be accessed, consuming power. Furthermore, since the cache access is often a critical timing path, the tag memory and data memory access may be optimized for timing and latency, which further increase power consumption. Still further, the caches are typically tagged with the physical address, and thus the translation circuitry is also typically in the critical path and thus optimized for timing and latency, which may increase power consumption in the translation circuitry.

SUMMARY OF THE INVENTION

In one embodiment, a processor comprises a cache, a first translation lookaside buffer (TLB), and a tag circuit coupled to the first TLB. The cache comprises a data memory configured to store a plurality of cache lines and a tag memory configured to store a plurality of tags. Each of the plurality of tags corresponds to a respective one of the plurality of cache lines. The first TLB is configured to store a plurality of page portions of virtual addresses identifying a plurality of virtual pages for which physical address translations are stored in the first TLB. The tag circuit is configured to identify one or more of the plurality of cache lines that are stored in the cache and are within the plurality of virtual pages. In response to a hit by a first virtual address in the first TLB and a hit by the first virtual address in the tag circuit, the tag circuit is configured to prevent a read of the tag memory in the cache.

In another embodiment, a method is contemplated. A first TLB is accessed with a first virtual address. The first TLB is configured to store a plurality of page portions of virtual addresses identifying a plurality of virtual pages for which physical address translations are stored in the first TLB. In response to a hit by the first virtual address in the first TLB, a tag circuit is accessed. The tag circuit is configured to identify a plurality of cache lines that are stored in a cache and are within the plurality of virtual pages. A hit is detected by the first virtual address in the first TLB and the tag circuit. In response to the hit by the first virtual address in the first TLB and the tag circuit, a read of a tag memory in the cache is prevented.

In yet another embodiment, a processor comprises a cache and a tag circuit. The cache comprises a data memory configured to store a plurality of cache lines and a tag memory configured to store a plurality of tags. Each of the plurality of tags corresponds to a respective one of the plurality of cache lines. The tag circuit is configured to detect a hit in the cache by a first virtual address for a subset of the plurality of cache lines. In response to a hit by the first virtual address in the tag circuit, the tag circuit is configured to prevent a read of the tag memory, and wherein the data memory is configured to output at least a portion of a first cache line corresponding to the first virtual address.

BRIEF DESCRIPTION OF THE DRAWINGS

The following detailed description makes reference to the accompanying drawings, which are now briefly described.

Figure 1:
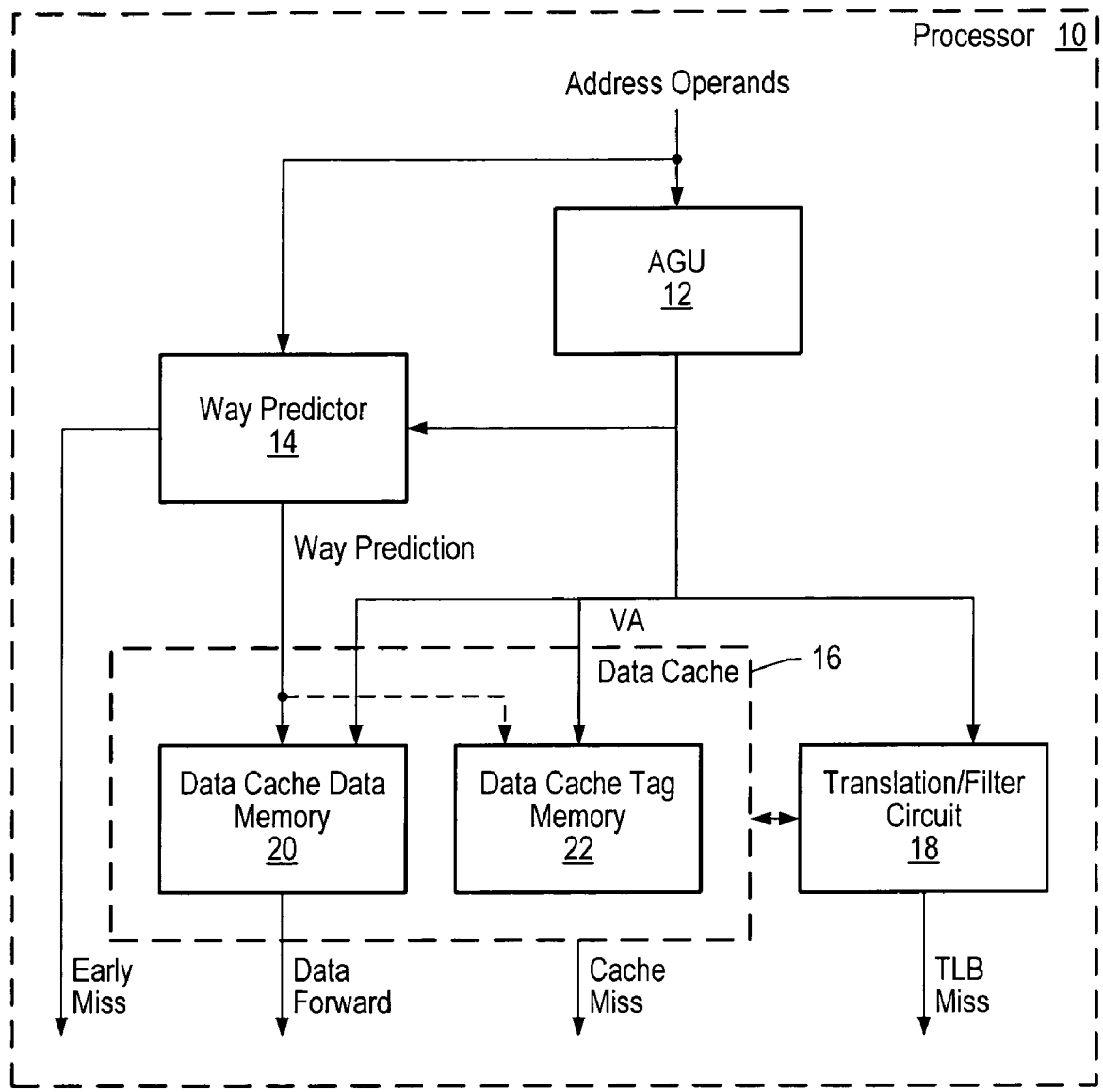
FIG. 1 is a block diagram of a portion of one embodiment of a processor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Turning now to FIG. 1, a block diagram of a portion of one embodiment of a processor 10 is shown. In the illustrated embodiment, the processor 10 includes an address generation unit (AGU) 12, a way predictor 14, a data cache 16, and a translation/filter circuit 18. The data cache 16 comprises a data cache data memory 20 and a data cache tag memory 22. The AGU 12 and the way predictor 14 are coupled to receive address operands. The AGU 12 is configured to generate a virtual address (VA), and is coupled to provide the virtual address to the way predictor 14, the data cache 16 (and more particularly to the data cache data memory 20 and the data cache tag memory 22), and the translation/filter circuit 18. The way predictor 14 is coupled to provide a way prediction to the data cache data memory 20, which is configured to forward data in response to the way prediction and the virtual address. The way predictor 14 is also coupled to provide an early miss indication. The translation/filter circuit 18 is coupled to the data cache 16, and is coupled to provide a translation lookaside buffer (TLB) miss indication. The data cache 16 is configured to generate a cache miss indication.

The AGU 12 is coupled to receive the address operands for a memory operation, and is configured to generate a virtual address responsive to the address operands. For example, the AGU 12 may comprise adder circuitry configured to add the address operands to produce the virtual address. As used herein, memory operations may include load operations (which read a memory location) and store operations (which write a memory location). Memory operations may be an implicit part of an instruction which specifies a memory operand, in some embodiments, or may be an explicit operation performed in response to a load or store instruction (also sometimes referred to as a move instruction). Address operands may be operands of the instruction corresponding to the memory operation that are defined to be used for generating the address of the memory operand. Address operands may include one or more of: register values from registers implemented by the processor 10, displacement data encoded into the instruction, and, in some embodiments, a segment base address from a segmentation mechanism implemented by the processor 10. A virtual address may comprise an address generated from the address operands of an instruction that has not yet been translated through the paging translation mechanism to a physical address (used to address memory in a computer system that includes the processor 10). For example, in one embodiment the processor 10 may implement the x86 instruction set architecture (also known as IA-32). In such an embodiment, the linear address may be an example of a virtual address. If paging translation is not enabled, the virtual address may be equal to the physical address.

The paging mechanism implemented by the processor 10 translates virtual addresses to physical addresses on a page granularity. That is, there may be one translation entry that is used for each virtual address in the page to identify the corresponding physical address. The page may be of any size. For example, 4 kilobytes is a typical size. The x86 instruction set also specifies a 2 Megabyte page size and a 4 Megabyte page size in some modes. The least significant bits of virtual addresses define an offset within the page, and are not translated by the paging mechanism. For example, with a 4 kilobyte page size, the least significant 12 bits of the virtual addresses form the page offset. The remaining bits of a virtual address, excluding the page offset, may form the page portion of the virtual address. The page portion may be used in the paging mechanism to select a physical address translation for the virtual address. Viewed in another way, the page portion of the virtual address may define a virtual page that is translated to a physical page by the physical address translation.

The processor 10 may employ one or more techniques to reduce power consumption. For example, the translation/filter circuit 18 may include a relatively small TLB (referred to as a microTLB herein) and a tag circuit (referred to herein as a micro tag circuit). The micro tag circuit may be configured to store a relatively small number of tags of cache lines which are: (i) in the virtual pages for which the microTLB is storing translations; and (ii) stored in the data cache 16.

The microTLB may be accessed in response to a virtual address and, if a hit in the microTLB is detected, then an access to a larger main TLB (or TLBs) in the translation/filter circuit 18 may be avoided. The power that would be consumed in accessing the main TLB may be conserved in such a case. Additionally, if a microTLB hit is detected, the micro tag may be accessed. If a hit in the micro tag is detected, a read of the data cache tag memory 22 to determine a cache hit/miss may be avoided as well (and thus the power that would be consumed in accessing the data cache tag memory 22 may be conserved as well). In either case (a hit in the micro tag or a hit in the data cache tag memory 22), the data from the hitting cache line may be forwarded from the data cache data memory 20. Thus, the microTLB may serve as a filter for accesses to the main TLB, and the microTLB and micro tag may serve as a filter for accesses to the data cache tag memory 22.

Another power conservation technique that may be implemented in the processor 10 uses the way predictor 14 for embodiments in which the data cache 16 is set associative. The way predictor 14 generates a way prediction for the data cache data memory 20 for a memory operation accessing the data cache 16. In response to the way prediction and the virtual address, the data cache data memory 20 may forward data (Data Forward in FIG. 1) to various processor circuitry that may use the data (not shown in FIG. 1). The data read from the data cache data memory 20 and forwarded may comprise a cache line or a portion of a cache line. Since data is forwarded in response to the way prediction, the translation circuitry and the cache tag circuitry may no longer be part of the critical path in the processor 10. In some embodiments, the translation circuitry and cache tag circuitry may be implemented using circuitry that has lower power consumption, even at the expense of some latency in the circuitry. Optionally, the filter structures such as the microTLB and the micro tag may be permitted to increase the latency of the translation circuitry and cache tag comparisons (and may further reduce overall power consumption by reducing access to the larger TLB structures and the data cache tag memory 22). Furthermore, the way predictor 14 may be used to reduce the power consumption of the processor 10 by permitting reduced power consumption in the data cache data memory 20. Various designs for the data cache data memory 20 are described in more detail below with regard to FIG. 9.

The way prediction may be validated using the microTLB/micro tag of the translation/filter circuit 18 and/or a tag comparison with a tag or tags from the data cache tag memory 22. If the way prediction is correct, operation may continue with the data forwarded by the data cache data memory 20 in response to the way prediction. On the other hand, if the way prediction is incorrect, the memory operation may be reattempted. Alternatively, in some embodiments, the data cache 16 may control replacement such that, if the way prediction is incorrect, the address is a miss in the data cache 16. In some embodiments, the correct way prediction may be determined during the validation of the way prediction, and the correct way may be accessed during the reattempt. In other embodiments, during the reattempt the unpredicted ways may be searched for a hit (e.g., a conventional set associative lookup in the data cache 16 may be performed). The reattempt may be accomplished in a variety of ways. For example, in some embodiments, a buffer may store instructions that have been issued for execution (e.g. a scheduler or reservation station). The memory operation may be reissued from the buffer. In other embodiments, the instruction corresponding to the memory operation and subsequent instructions may be refetched (e.g. from an instruction cache or from memory).

In some embodiments, the use of the way predictor 14 may reduce power consumption in the data cache tag memory 22. To validate the way prediction, only the tag in the predicted way need be accessed and compared. Some embodiments may thus access only the predicted way in the data cache tag memory 22 (if a miss in the micro tag is detected, and thus an access in the data cache tag memory 22 is performed to detect whether or not a cache miss occurs). If a miss is detected in the predicted way, the memory operation may be reattempted as described above. In such embodiments, the data cache tag memory 22 may receive the way prediction as illustrated by the dotted arrow in FIG. 1.

The way predictor 14 may also provide an early miss indication if no way prediction may be generated for a given memory operation. The way predictor may include a memory that stores an indication of the address stored in each way of the cache, and may compare the indication to a corresponding indication of the virtual address of the memory operation to generate the way prediction of the memory operation. If the corresponding indication does not match any of the indications in the way predictor, then no way prediction may be made (and a miss may be detected). The early miss indication may be used as a hint to an L2 cache (with the data cache 16 serving as the L1 cache) that a miss in the data cache 16 is occurring and thus permitting the L2 cache to begin an access earlier in time than waiting for the cache miss from the translation/filter circuit 18.

The data cache 16 may indicate cache miss and the translation/filter circuit 18 may indicate TLB miss to other circuitry in the processor 10 for corrective action (e.g. table walking to locate a translation to be stored in the TLBs, a cache fill to fill the missing cache line into the data cache 16, etc.). Circuitry for table walking and for accessing the memory to retrieve a missing cache line is not shown in FIG. 1.

In the illustrated embodiment, the data cache 16 may be set associative. Other embodiments may be fully associative, and the way predictor 14 may be used to predict a hit in any entry in the data cache 16. Embodiments which do not implement the way predictor 14 may have other configurations (e.g. direct-mapped). As used herein, a cache line may be a number of contiguous bytes that is the unit of allocation/deallocation in a cache (e.g. a data cache or instruction cache). For example, a cache line may be 32 contiguous bytes or 64 contiguous bytes, although any size cache line may be implemented. The data cache data memory 20 may comprise a plurality of entries, each entry configured to store a cache line. The entries may be arranged into sets of W cache lines, for set associative embodiments. The data cache tag memory 22 also comprises a plurality of entries, each entry configured to store a tag for a corresponding entry in the data cache data memory 20. The data cache tag memory 22 entries may be arranged into sets of W, corresponding to the arrangement of the data cache data memory 20.

In some embodiments, the data cache 16 may be physically tagged (i.e. the tags in the data cache tag memory 22 may be physical addresses). Generally, a hit may be detected in the data cache 16 if the data corresponding to a given physical address is stored in the data cache 16. If the data corresponding to the given physical address is not stored in the data cache 16, a miss is detected. However, in some cases it may be convenient to discuss a virtual address hitting in the data cache 16 even if the data cache 16 is physically tagged. A virtual address may be a hit in the data cache 16 if the corresponding physical address (to which the virtual address translates) is a hit. In some cases, the virtual address may be detected as a hit without actually using the corresponding physical address (e.g. in the micro tag discussed in more detail below).

Generally, the processor 10 may include any other circuitry according to the desired design. In various embodiments, the processor 10 may be superscalar or scalar, may implement in order instruction execution or out of order instruction execution, etc. and may include circuitry to implement the above features. In some embodiments, for example, more than one AGU 12 may be provided and may generate virtual addresses in parallel. The way predictor 14, the data cache 16, and the translation/filter circuit 18 may include circuitry to handle multiple virtual addresses in parallel for such embodiments, or may include circuitry for otherwise handling the multiple virtual addresses.

It is noted that, while the way predictor 14 and the microTLB/micro tag features of the translation/filter circuit 18 are described as being used together to provide reduced power consumption, embodiments are contemplated which implement the way predictor 14 without implementing the microTLB/micro tag. Additionally, embodiments are contemplated in which the microTLB/micro tag are implemented without the way predictor 14 (e.g. by delaying the data forwarding from the data cache 16 until a way selection is determined). For example, the micro tag may output a way selection, in some embodiments, for a hit detected therein.

It is noted that, while the microTLB/micro tag circuitry and the way predictor 14 are illustrated as used with a data cache, any of the microTLB, micro tag, and/or way predictor 14 may be used with an instruction cache in the processor, as desired.

Figure 2:
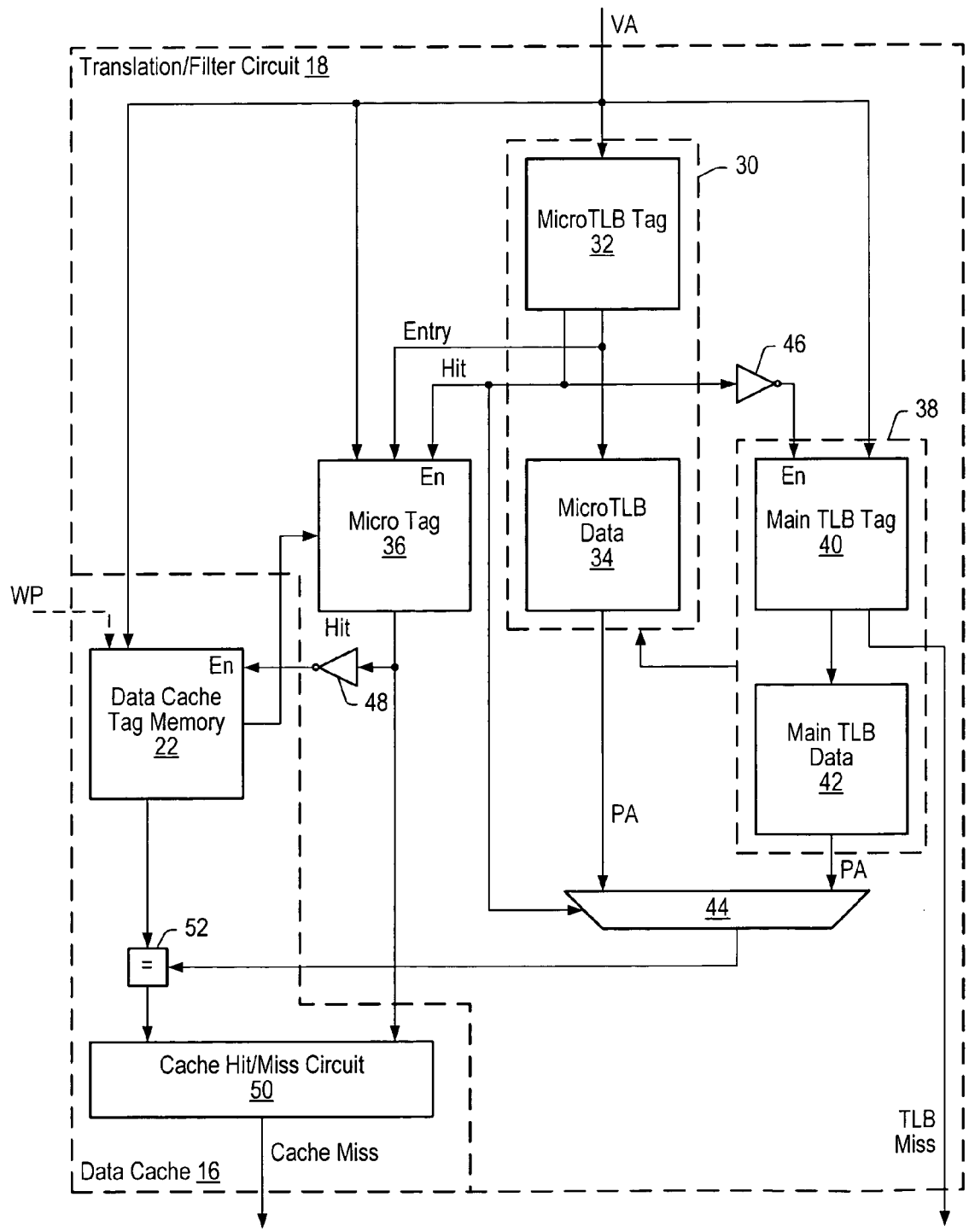
FIG. 2 is a block diagram of one embodiment of a translation and filter block shown in FIG. 1.

Turning next to FIG. 2, a block diagram of one embodiment of the translation/filter circuit 18 is shown. In the illustrated embodiment, the translation/filter circuit 18 includes a microTLB 30 (including a microTLB tag circuit 32 and a microTLB data circuit 34), a micro tag circuit 36, a main TLB 38 (including a main TLB tag circuit 40 and a main TLB data circuit 42), a mux 44 and inverters 46 and 48. Also shown in FIG. 2 is a portion of the data cache 16 including the data cache tag memory 22, a cache hit/miss circuit 50, and a comparator 52. The microTLB 30 (and more particularly the microTLB tag circuit 32), the micro tag circuit 36, the data cache tag memory 22, and the main TLB 38 (and more particularly the main TLB tag circuit 40) are coupled to receive the virtual address from the AGU 12. The microTLB tag circuit 32 is configured to output a hit signal to the microTLB data circuit 34, the micro tag circuit 36, the mux 44, and the inverter 46 (which is further coupled to the main TLB tag circuit 40). The microTLB tag circuit 32 is further configured to output an entry indication to the microTLB data circuit 34 and the micro tag circuit 36. The micro TLB data circuit 34 is configured to output a physical address (PA) to the mux 44, as is the main TLB data circuit 42. The output of the mux 44 is coupled to the comparator 52. The main TLB tag circuit 40 is coupled to the main TLB data circuit 42, and to provide a TLB miss indication. The micro tag circuit 36 is configured to output a hit signal to the inverter 48 (which is further coupled to the data cache tag memory 22) and to the cache hit/miss circuit 50. The cache hit/miss circuit 50 is further coupled to the comparator 42, and to provide a cache miss indication.

The microTLB 30 receives the virtual address from the AGU 12, and compares the page portion of the virtual address to the page portions of virtual addresses corresponding to translations that are stored in the microTLB 30. More particularly, the microTLB tag circuit 32 may comprise a plurality of entries storing the page portions of the virtual addresses. The corresponding physical addresses and other information from the page tables that provided the translation may be stored in the microTLB data circuit 34. The microTLB tag circuit 32 performs the comparison, and outputs the hit signal indicating whether or not the virtual address hits in the microTLB and, if a hit is indicated, the entry indication indicating which entry is hit. The microTLB data circuit 34 may receive the entry indication, and may output the corresponding physical address to the mux 44. The hit signal may cause the mux 44 to select the physical address from the microTLB 30 as the output to the comparator 52. While a fully associative embodiment is described in more detail herein, other embodiments may employ other configurations. In various embodiments, the microTLB 30 may have a fully associative, set associative, or direct-mapped configuration, for example.

Additionally, the hit signal from the microTLB 30 may serve as an enable to the micro tag circuit 36. The micro tag circuit 36 may store tags for a plurality of cache lines within the virtual pages for which the microTLB 30 stores translations. Thus, if there is a miss in the microTLB, the micro tag circuit 36 also misses. If there is a, hit in the microTLB, then it is possible that the micro tag circuit 36 will hit. Additionally, the micro tag circuit 36 receives the entry indication. The micro tag circuit 36 determines whether or not there is a hit in the micro tags circuit 36 for the virtual address, and generates a hit signal. If there is a hit in the micro tag circuit 36, then the virtual address hits in the data cache 16 and the tag access in the data cache tag memory 22 may be prevented. Thus, the hit signal from the micro tag circuit 36 serves as a disable for the data cache tag memory 22, preventing the data cache tag memory 22 from reading any tags in response to the virtual address. The inverter 48 may thus invert the hit signal from the micro tag circuit 36 and provide the output to the data cache tag memory 22 as an enable. The cache hit/miss circuit 50 also receives the hit signal from the micro tag circuit 36, and may not indicate a cache miss for the virtual address if the hit signal indicates a hit in the micro tag circuit 36. The hit/miss from the comparator 52 may be ignored in this case.

If there is a miss in the micro tag circuit 36 (or if the micro tag circuit 36 is not enabled due to a miss in the microTLB circuit 30), the data cache tag memory 22 is enabled and outputs a tag or tags to the comparator 52. In some embodiments that implement the way predictor 14, only the tag from the predicted way may be output. The data cache tag memory 22 may be coupled to receive the way prediction (WP) for such an embodiment. Other embodiments may output each tag in the indexed set for comparison. In such embodiments, the cache miss indication may indicate miss, or miss in the predicted way but hit in an unpredicted way, so that a cache fill does not occur if a hit in an unpredicted way occurs. In some embodiments, the selection of a replacement way when a cache miss occurs may be controlled so that a hit in an unpredicted way does not occur. An example of such replacement is discussed below with regard to FIGS. 9 and 10. The comparator 52 provides the comparison results to the cache hit/miss circuit 50, which generates the cache miss indication accordingly. If there is a hit in the data cache tag memory 22 and there was a hit in the microTLB 30, the micro tag circuit 36 may be loaded with the tag from the data cache tag memory 22.

Since the micro tag circuit 36 stores tags that are also in the data cache tag memory 22, the micro tag circuit 36 may be maintained coherent with the data cache tag memory 22. A cache line may be invalidated in the data cache 16 due to replacement via a cache fill of a missing cache line, or may be invalidated due to a snoop hit generated from an access by another processor or agent on an interconnect to which the processor 10 is coupled. In one embodiment, the entire contents of the micro tag circuit 36 may be invalidated in response to an update in the data cache tag memory 22. Alternatively, only entries in the micro tag circuit 36 having the same cache index as the index at which the update is occurring may be invalidated. In yet another alternative, only entries in the micro tag circuit 36 having: (i) the same cache index as the index at which the update is occurring; and (ii) the same virtual address (in the corresponding the microTLB entry) as the cache line being invalidated in the data cache 16 may be invalidated.

The micro tag circuit 36 stores tags within virtual pages that are translated by entries in the microTLB 30. Thus, when the microTLB 30 is updated, the micro tag may be updated as well. In one embodiment, if the microTLB 30 is updated, the entire contents of the micro tag circuit 36 may be invalidated. Alternatively, selective invalidation of tags in the micro tag circuit 36 that correspond to microTLB entries that are being changed may be implemented.

The microTLB 30 also serves as a filter for the main TLB 38. That is, if there is a hit in the microTLB 30, an access to the main TLB 38 is prevented. Thus, the hit signal output by the microTLB 30 may be inverted by the inverter 46 and input to an enable input on the main TLB tag circuit 40. The main TLB tag circuit 40 may prevent access to the main TLB tags if the enable input is not asserted.

If there is a miss in the microTLB 30, the main TLB tag circuit 40 may determine is if the virtual address is a hit in the main TLB 38. If there is a hit, the main TLB data circuit 42 may be accessed to output the corresponding physical address to the mux 44. Additionally, the microTLB 30 may be loaded with the translation from the main TLB 38. Since there is a miss in the microTLB 30, the mux 44 selects the physical address output by the main TLB data circuit 42 as the output to the comparator 52. If the main TLB 38 is enabled and a miss in the main TLB 38 is detected, the main TLB 38 generates the TLB miss indication to cause a table walk of the page tables to locate the desired translation. During the table walk, the processor 10 may, in some embodiments, pause operation to reduce power consumption. In one embodiment, the microTLB 30 may not be loaded when the main TLB 38 is loaded. A subsequent miss for the page in the microTLB 30 may be detected and a hit in the main TLB 38 may be detected, at which time the microTLB 30 may be loaded. Alternatively, the microTLB 30 may be loaded at the same time as the main TLB 38 is loaded.

Since the microTLB 30 stores translations that are also stored in the main TLB 38, the microTLB 30 may be maintained coherent with the main TLB 38. When an entry is overwritten in the main TLB 38 (in response to a main TLB 38 miss and successful table walk), the corresponding entry (if any) is invalidated in the microTLB 30. In one embodiment, the entire contents of the microTLB 30 may be invalidated when the main TLB 38 is loaded with a new entry.

In one embodiment, the main TLB 38 may comprise two TLBs: one storing 4 kilobyte page-size translations and another storing 2 Megabyte or 4 Megabyte page-sized translations. The 4 kilobyte TLB may comprise any configuration, but in one implementation may be a 4-way 512 entry TLB. The 2 Megabyte/4 Megabyte TLB may comprise any configuration, but in one example by be an 8 entry, fully associative TLB. In one embodiment implementing the x86 instruction set architecture, the CR3 configuration register stores the base address of the page tables in memory. The entries in the main TLB 38 may be tagged with the CR3 address from which the translation was read, so that the main TLB 38 need not be invalidated in response to changes in the CR3 address. The entries in the microTLB 30 may be similarly tagged, in some embodiments, or may not be tagged and instead may be invalidated in response to a change in the CR3 address.

It is noted that, while hit signals are described as being provided by the microTLB 30 and the micro tag circuit 36, generally a hit indication may be provided, comprising any number of signals indicating whether or not a hit is detected. Furthermore, while the microTLB 30 is shown as outputting a hit indication and an entry indication identifying the entry that is hit, any indication of hit and entry may be provided. For example, in one embodiment, the hit and entry indications may be merged into a one-hot encoding corresponding to the entries in the microTLB 30. The one-hot encoding may indicate (with any bit asserted) that there is a hit, and may indicate the entry that is hit via which bit is asserted.

Figure 3:
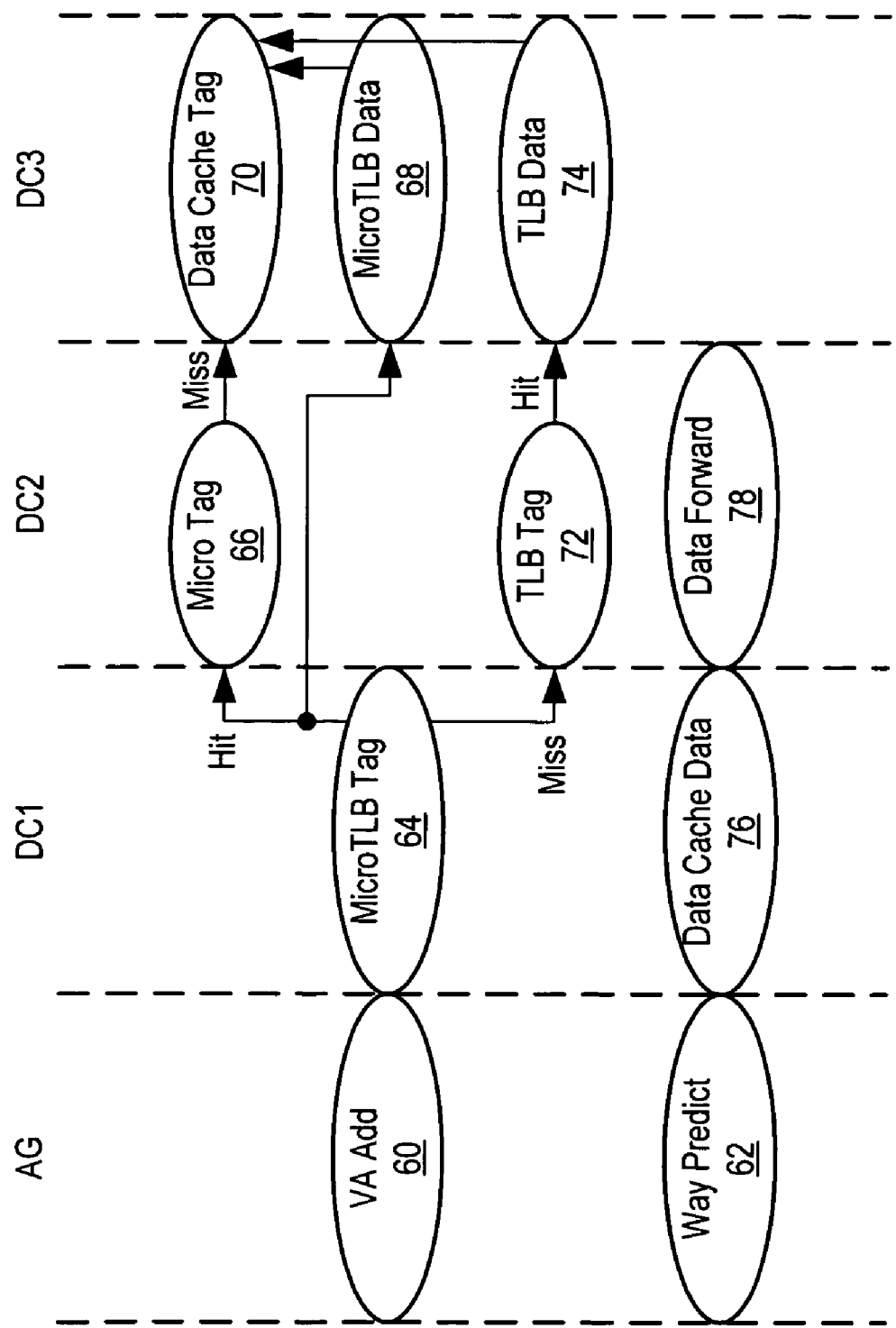
FIG. 3 is a timing diagram illustrating one embodiment of a pipeline that may be implemented by one embodiment of the processor.

It is noted that, in some embodiments, the translation/filter circuit 18 may be operable across several pipeline stages. Pipeline storage devices (e.g. flops, registers, etc.) are not illustrated in FIG. 2. Any division into pipeline stages may be used. For example, FIG. 3 illustrates one example of a pipeline that may be implemented by one embodiment of the processor 10. Vertical dashed lines denlimit clock cycles in FIG. 3. The clock cycles are labeled AG (address generation), DC1 (data cache 1), DC2 (data cache 2), and DC3 (data cache 3).

During the AG stage, the AGU 12 generates the virtual address from the address operations (reference numeral 60). Additionally, in this embodiment, the way predictor 14 generates a way prediction (reference numeral 62). The way predictor 14 may receive the address operands, and may perform sum address indexing (described in more detail below) to address a memory storing way prediction values. Alternatively, the virtual address from the AGU 12 may be used to index the way prediction memory. In other embodiments, the way predictor 14 may operate in the DC1 stage.

During the DC1 stage, the microTLB tag circuit 32 is accessed and a hit/miss in the microTLB 30 is determined (reference numeral 64). If there is a hit in the microTLB 30, the micro tag circuit 36 is accessed in the DC2 stage (reference numeral 66) and the microTLB data circuit 34 is accessed during the DC3 stage (reference numeral 68). If there is a hit in the micro tag circuit 36, the data cache tag access may be avoided and a hit in the data cache 16 is detected via a hit in the micro tag circuit 36. If there is a miss in the micro tag circuit 36, the data cache tag memory 22 is accessed in the DC3 stage (reference numeral 70), and compared to the output of the microTLB data circuit 34.

If there is a miss in the microTLB 30, the main TLB tag circuit 40 is accessed during the DC2 stage (reference numeral 72) and, if there is a hit in the main TLB tag circuit 40, the TLB data circuit 42 is accessed in the DC3 stage (reference numeral 74). The output of the TLB data circuit 42 is compared to the output of the data cache tag memory 22 in the DC3 stage.

Additionally during the DC1 stage, the data cache data memory 20 is accessed and the data from the predicted way is output (reference numeral 76). The data is forwarded in the DC2 stage (reference numeral 78).

Figure 4:
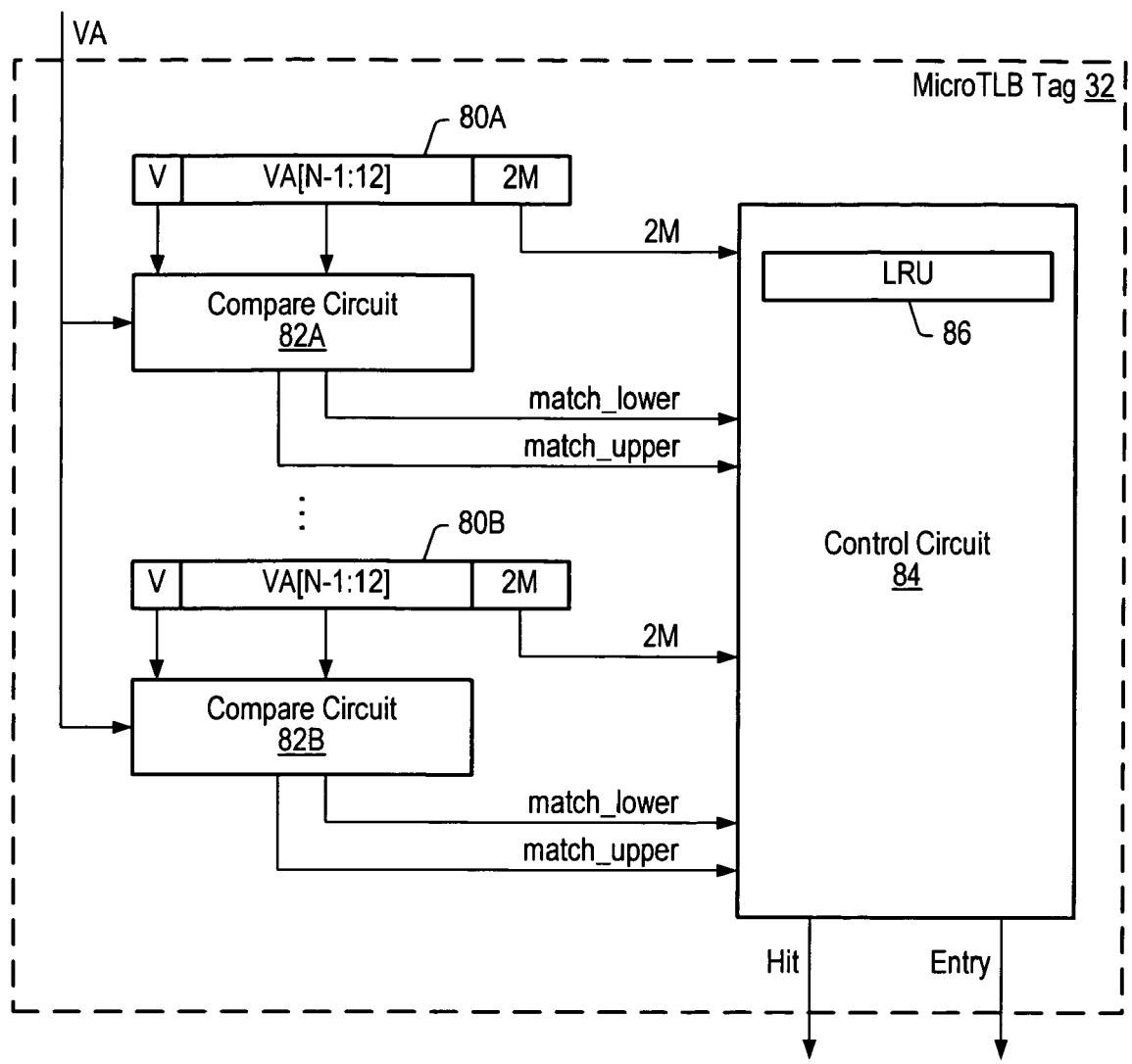
FIG. 4 is a block diagram of one embodiment of a microTLB tag circuit.

Turning next to FIG. 4, a block diagram of one embodiment of the microTLB tag circuit 32 is shown. In the embodiment of FIG. 4, the microTLB tag circuit 32 includes a set of entries including entries 80A and 80B, corresponding compare circuits 82A and 82B coupled to the entries 80A and 80B, respectively, and a control circuit 84 coupled to the entries 80A–80B and the compare circuits 82A–82B. The compare circuits 80A and 80B are coupled to receive the virtual address from the AGU 12. The control circuit 84 includes a least recently used (LRU) storage 86, and is configured to generate the hit signal and entry indication outputs of the microTLB tag circuit 32.

The microTLB tag circuit 32 may include any number of entries 80A–80B. For example, 4 entries may be implemented in one embodiment. Other embodiments may implement more or fewer entries. Each entry 80A–80B may include a valid bit (V), a virtual address field storing a page portion of the virtual address (VA[N−1:12]) that is translated by the entry (and the corresponding entry in the microTLB data circuit 34, which together form an entry of the microTLB 30), and a 2M bit indicating whether or not the translation is derived from a 2 Megabyte page translation. Thus, an N-bit virtual address is used in the present embodiment, where N is an integer. For example, N may be 32 in some embodiments. In other embodiments, N may be 48. In other embodiments, N may any integer between 32 and 64, inclusive. Generally, the entries may comprise any type of storage. For example, registers, flip-flops, or other types of clocked storage devices may be used in one embodiment.

The compare circuits 82A–82B receive at least the page portion of the virtual address from the AGU 12 and compare the page portion of the virtual address to the page portion stored in the corresponding entry 80A–80B. The illustrated embodiment implements a minimum page size of 4 kilobytes (and thus bits 11:0 are not included in the page portion of the virtual address) and also implements a 2 Megabyte page size for compatibility with the x86 instruction set architecture. Other page sizes may be implemented. In the illustrated embodiment, the compare circuits 82A–82B generate two match signals: match_lower and match_upper. Match_upper may be asserted if the valid bit is set in the entry and the portion of the virtual addresses that is included in the 2M page range match (that is, VA[N–1:21]). Match_lower may be asserted if the remainder of the virtual addresses match (that is, VA[20:12]).

The control circuit 84 is coupled to receive the outputs of the compare circuits 82A–82B and is configured to generate the hit signal and entry indication responsive thereto. If a hit is indicated in one of the entries, the control circuit 84 may assert the hit signal and provide the entry indication. If a hit is not indicated, then the control circuit 84 may not assert the hit signal.

Figures 5, 6:
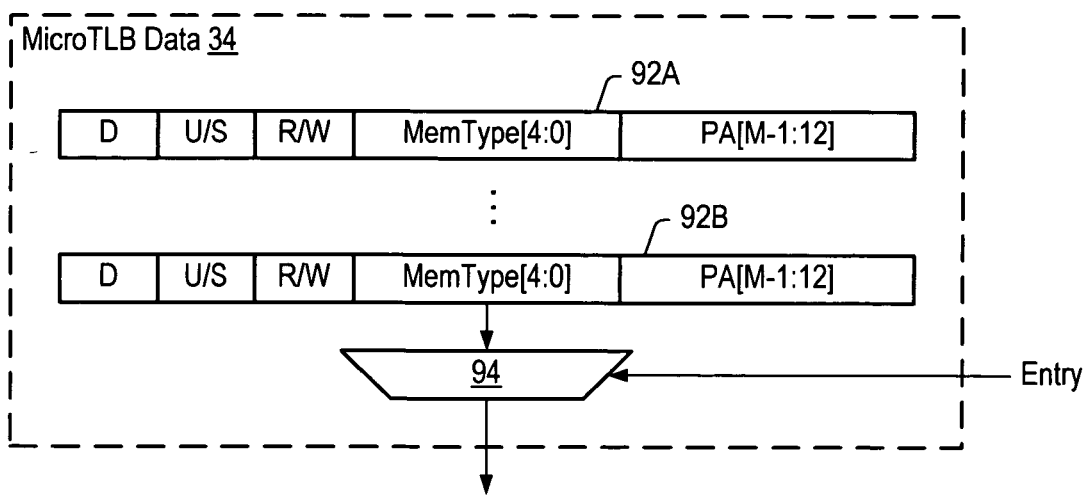
FIG. 5 is a block diagram of one embodiment of a truth table corresponding to a control circuit shown in FIG. 4.
FIG. 6 is a block diagram of one embodiment of a microTLB data circuit.

FIG. 5 is one embodiment of a truth table 90 that may be implemented by the control circuit 84 for determining if an entry is hit by a virtual address. Illustrated in the table 90 is the 2M bit from the entry (set to indicate a 2M translation in this embodiment), the match_upper and match_lower signals (with a one in the table 90 indicating asserted and a zero indicating not asserted), and a result column stating what each combination of the 2M bit, the match_upper signal, and the match_lower signal indicates.

If the match_upper signal is deasserted, the control circuit 84 detects a microTLB miss for the virtual address. The microTLB misses independent of the setting of the 2M bit and the state of the match_lower signal. Accordingly, the micro tag circuit 36 also misses.

If the 2M bit is set, then the corresponding translation is for a 2 Megabyte page. Thus, VA[20:12] would not generally be included in the comparison. However, to provide bits for the micro tag circuit 36, these bits may be defined to be the last 4 kilobyte page accessed by the processor 10 within the 2 Megabyte page. If the match_upper signal is asserted, and the 2M bit is set, then the microTLB hits. However, if the match_lower signal is deasserted, the micro tag circuit 36 misses for this page. If the match_lower signal is asserted, the micro tag circuit 36 may hit and thus a micro tag lookup is performed.

If the 2M bit is clear, then the corresponding translation is for a 4 kilobyte page. Thus, both match_upper and match_lower are asserted to indicate a microTLB hit (and a possible micro tag hit, thus a micro tag lookup is performed). If the match_lower is not asserted, then a microTLB and a micro tag miss are detected.

For the control circuit 84 implementing the embodiment of FIG. 5, the hit indication provided to the micro tag circuit 36 may differ from the hit indication provided to the main TLB 38. The hit indication to the main TLB 38 may indicate a hit in the microTLB 30 as long as the translation is a hit (entries in the table 90 that state microTLB hit), even if the micro tag circuit 36 is a miss. The hit indication to the micro tag circuit 36 may indicate hit if a micro tag lookup is indicated (entries in the table 90 that state micro tag lookup).

The embodiment of FIGS. 4 and 5 supports two different page sizes. Other embodiments may support a single page size, and thus a single match signal from each of the compare circuits 82A–82B may be provided and the 2M bit may be eliminated from the entries 80A–80B. Other embodiments may support more than two page sizes by further dividing the page portion of the virtual address according to the supported page sizes. It is noted that the x86 instruction set architecture also supports a 4 Megabyte page size. The embodiment of FIGS. 4 and 5 may support the 4 Megabyte page size using two 2 Megabyte entries in the microTLB 30. Other embodiments may support the 4 Megabyte page size directly (e.g. using a 4M bit in each entry similar to the 2M bit).

While the above embodiment supports the 2 Megabyte page size using an entry for the 2 Megabyte page and identifying the most recently accessed 4 kilobyte page within the 2 Megabyte page using VA[20:12], other embodiments may allow for multiple microTLB entries for a given 2 Megabyte page. Each of the entries may have a different encoding in VA[20:12] for different 4 kilobyte pages that have been accessed. In yet another alternative, VA[20:12] may be included in the micro tag circuit 36 for 2 Megabyte pages, and a hit on a 2 Megabyte page may be used to access the micro tag to detect a hit for a cache line within the 2 Megabyte page.

In the case of a miss in the microTLB 30 and a hit in the main TLB 38, the control circuit 84 may select an entry 80A–80B to be replaced with the hitting translation from the main TLB 38. In the illustrated embodiment, the control circuit 84 may maintain an LRU of the entries 80A–80B and may select the least recently used entry for replacement. Any other replacement algorithm may be implemented (e.g. pseudo-LRU, random, etc.). The entries 80A–80B may be coupled to receive an input page portion of a virtual address (VA[N–1:12]) and 2M bit to be stored in one of the entries under the control of the control circuit 84 (input address and 2M bit not shown in FIG. 4). The source of the input virtual address and 2M bit may be the main TLB 38, or the table walk circuitry, in various embodiments).

FIG. 6 is a block diagram of one embodiment of the microTLB data circuit 34. In the embodiment of FIG. 6, the microTLB data circuit 34 includes a set of entries including entries 92A–92B. Each of the entries 92A–92B corresponds to a respective one of the entries 80A–80B in FIG. 4. Additionally, a mux 94 is illustrated, coupled to the entries 92A–92B and receiving the entry indication from the microTLB tag circuit 32. The mux 84 may select the contents of the entry indicated by the entry indication for output. In one implementation, if no entry is indicated (i.e. a miss), then no entry 92A–92B is selected by the mux 94 (which may reduce power consumption). Similar to the entries 80A–80B in FIG. 4, the entries 92A–92B may be implemented in any type of storage (e.g. various clocked storage devices, in one embodiment).

In the illustrated embodiment, the contents of each entry 92A–92B include a dirty bit (D), a user/supervisor (U/S) bit, a read/write (R/W) bit, a memory type field (MemType[4:0]), and a physical address field (PA[M–1:12]). The bits may be compatible, in one embodiment, with the paging mechanism defined in the x86 instruction set architecture. The dirty bit may indicate whether or not the physical page has been modified (e.g. whether or not the processor has executed a store instruction to the page). The user/supervisor bit may indicate user (unprivileged) pages versus supervisor (privileged pages). The read/write bit may indicate whether the page is read-only or read/write. The memory type field may identify which memory type is used for the page.

An M bit physical address is supported in the illustrated embodiment. M may be any integer. Particularly, M may differ from N. In one implementation, M may be any integer between 32 and 64, inclusive. In another implementation, M may be any integer between 32 and 52, inclusive. For example, M may be 40 in one particular implementation.

Figure 7:
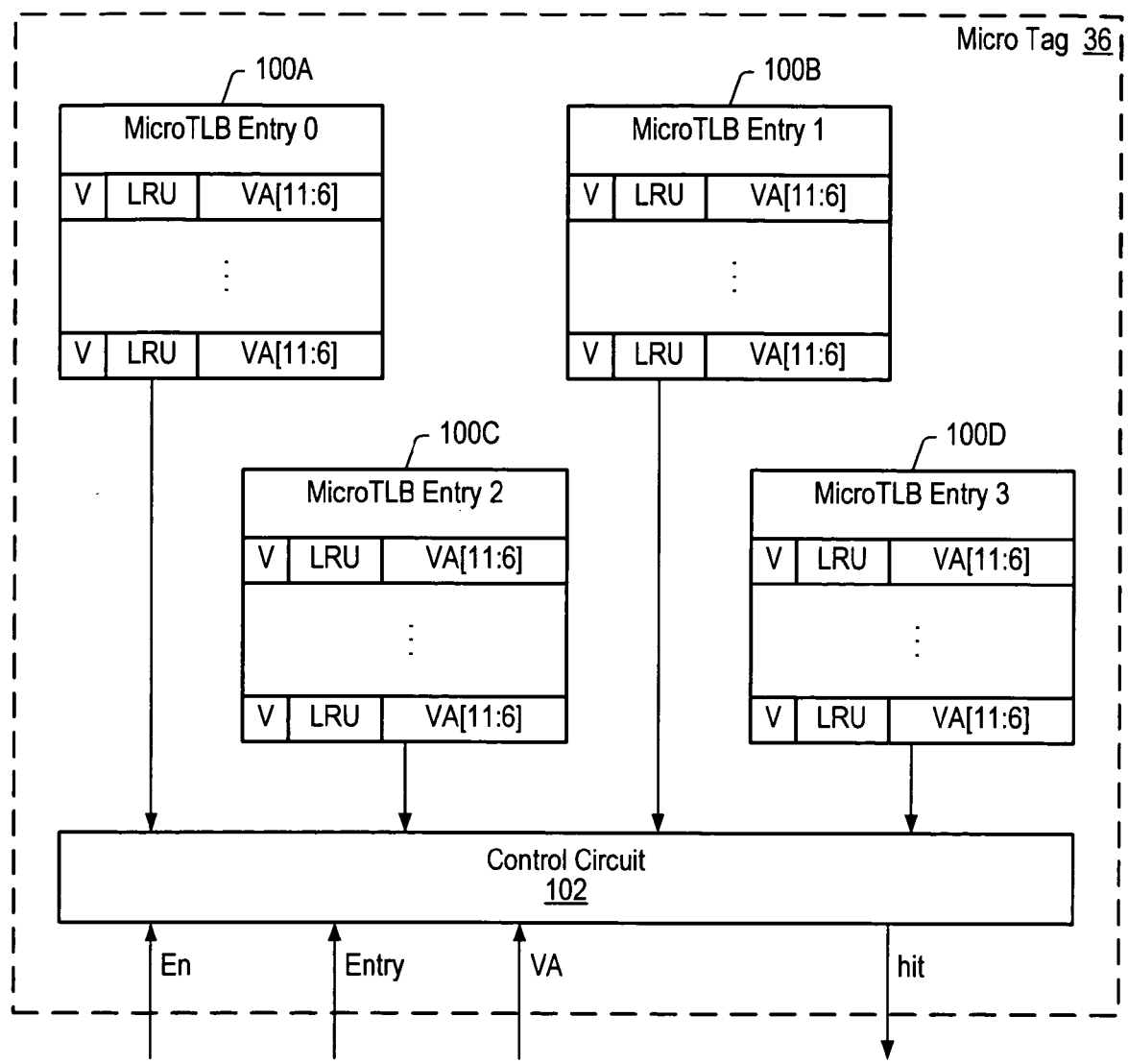
FIG. 7 is a block diagram of one embodiment of a micro tag circuit.

Turning now to FIG. 7, a block diagram of one embodiment of the micro tag circuit 36 is shown. In the illustrated embodiment, a plurality of entries in the micro tag circuit 36 are divided into groups of entries. Each group of entries is assigned to a different entry of the microTLB. For example, in the illustrated embodiment, groups 100A–100D are shown corresponding to four entries in the microTLB 30. Other embodiments may include any number of groups to correspond to any number of entries. The groups 100A–100D are coupled to a control circuit 102, which is coupled to receive the enable input (En) (the hit signal from the microTLB tag circuit 32), the entry indication from the microTLB tag circuit 32, and the virtual address from the AGU 12. The control circuit 102 is configured to generate the hit indication output by the micro tag circuit 36.

The entries in the selected group 100A–100D are assigned to one of the entries in the microTLB tag circuit 32 and identify cache lines in the virtual page indicated by that entry which are also stored in the data cache 16. Any number of entries may be included in a group. For example, in one embodiment, four entries may be included in each group. Since the micro tag circuit 36 is accessed if a microTLB hit is detected, it is known that VA[N−1:12] matches for the virtual address from the AGU 12 and the virtual address of the cache lines represented in the selected group 100A–100D. Accordingly, to complete a virtual tag compare, the entries in the selected group 100A–100D may store the page offset portion of the virtual address (excluding the address bits which form the cache line offset). For the illustrated embodiment, a cache line size of 64 bytes is assumed and thus address bits 5:0 are excluded. Other cache line sizes may be selected in other embodiments. The remaining virtual address bits to complete the virtual tag comparison are thus VA[11:6] for this embodiment, and each micro tag entry stores the VA[11:6] as shown in FIG. 7.

If the enable input is asserted, control circuit 102 may compare the address bits VA[11:6] from each entry to the corresponding bits of the virtual address from the AGU 12. Thus, the control circuit 102 may be coupled to receive at least the page offset portion of the virtual address from the AGU 12 (excluding the cache line offset bits). If a match is detected in an entry within the selected group 100A–100D and the valid bit (V) in that entry is set, then the virtual address is a hit in the micro tag circuit 36 and thus is a hit in the data cache 16. The data cache tag memory 22 need not be accessed to determine hit/miss. On the other hand, if a match is not detected in an entry within the selected group 100A–100D, then the data cache tag memory 22 may be accessed to determine if the address is a hit or miss in the data cache 16. The control circuit 102 generates the hit signal according to the comparison results.

It is noted that, if the data cache 16 is physically tagged (i.e. the data cache tag memory 22 stores physical tags rather than virtual tags) and at least one translated address bit is used in the index to the data cache 16 (e.g. at least bit 12 is used, in a 4 kilobyte page embodiment), then it is possible that aliasing of multiple virtual addresses to the same physical address may affect the operation of the micro tag circuit 36 (since the index may differ from the virtual address bits used in the comparison). In one such embodiment, the data cache 16 may be physically tagged but the processor 10 may ensure that at most one virtual address aliased to the same physical address is stored in the data cache 16 at any given time. That is, if a second alias is being loaded into the data cache 16 while the first alias is still residing in the cache, the first alias is invalidated in the data cache 16.

It is noted that, in some embodiments in which the cache index includes at least one translated address bit, the micro tag circuit 36 may store each address bit that is included in the cache index, and the translated address bits may be physical bits. Storing such bits may permit targeted invalidation of micro tag circuit 36 entries, if invalidation of all entries is not desired (e.g. in response to changes in the data cache 16 content or the microTLB 30 content).

In the event of a hit in the microTLB 30, a miss in the micro tag circuit 36, and a hit in the data cache tag memory 22, one of the entries in the corresponding group 100A–100D may be replaced with the hitting tag. The control circuit 102 may maintain LRU information within each group 100A–100D (shown as an LRU field in each entry) which may be used to select the LRU entry within the selected group 100A–100D for replacement. Other embodiments may employ other replacement schemes (e.g. random, pseudo-LRU, etc.). The groups 100A–100D may be coupled to receive VA[11:6] from the data cache 16 for storing a missing index in the micro tag circuit 36, in some embodiments (not shown in FIG. 7).

It is noted that, while the entries of the micro tag circuit 36 are statically assigned to microTLB entries in the illustrated embodiment, in other embodiments the entries may be dynamically assigned as needed to each microTLB entry. In such an embodiment, a microTLB entry field may be included in each micro tag entry, storing an indication of the microTLB entry to which that micro tag entry is currently assigned. The control circuit 102 may compare the entry indication to the indication received from the microTLB 30 during an access, and may detect a hit if the entry indication matches and the VA[11:6] field matches the corresponding portion of the virtual address from the AGU 12.

It is noted that, while the micro tag circuit 36 is used with the microTLB in this embodiment, other embodiments may implement the micro tag circuit 36 without the microTLB. Such embodiments may implement full tags in each entry of the micro tag circuit 36 and may detect a cache hit and prevent a read in the data cache tag memory 22 by comparing the full tag. Whether the hit is detected in the micro tag circuit 36 or the data cache tag memory 22, the data may be forwarded from the data cache data memory 20.

In an alternative embodiment, the micro tag circuit 36 may comprise a single entry per microTLB entry. The micro tag entry may store a bit per cache line within the page identified by the microTLB entry, indicating whether or not that cache line is a hit in the data cache 16. Thus, for example, if cache lines are 64 bytes and a 4 kilobyte page is used, the micro tag entry may comprise 64 bits. The bit corresponding to a given cache line may indicate hit if the bit is set and miss if the bit is clear (or the opposite encoding may be used). A control circuit may use the in-page portion of the VA excluding the cache line offset portion (e.g. bits 11:6 in an 64 byte cache line embodiment) to select the appropriate bit for determining cache hit/miss. In such an embodiment, the micro tag circuit may be incorporated into the microTLB circuit. The term "tag circuit" or "micro tag circuit" is intended to include such embodiments in which the micro tag circuitry is incorporated into the microTLB.

Figure 8:
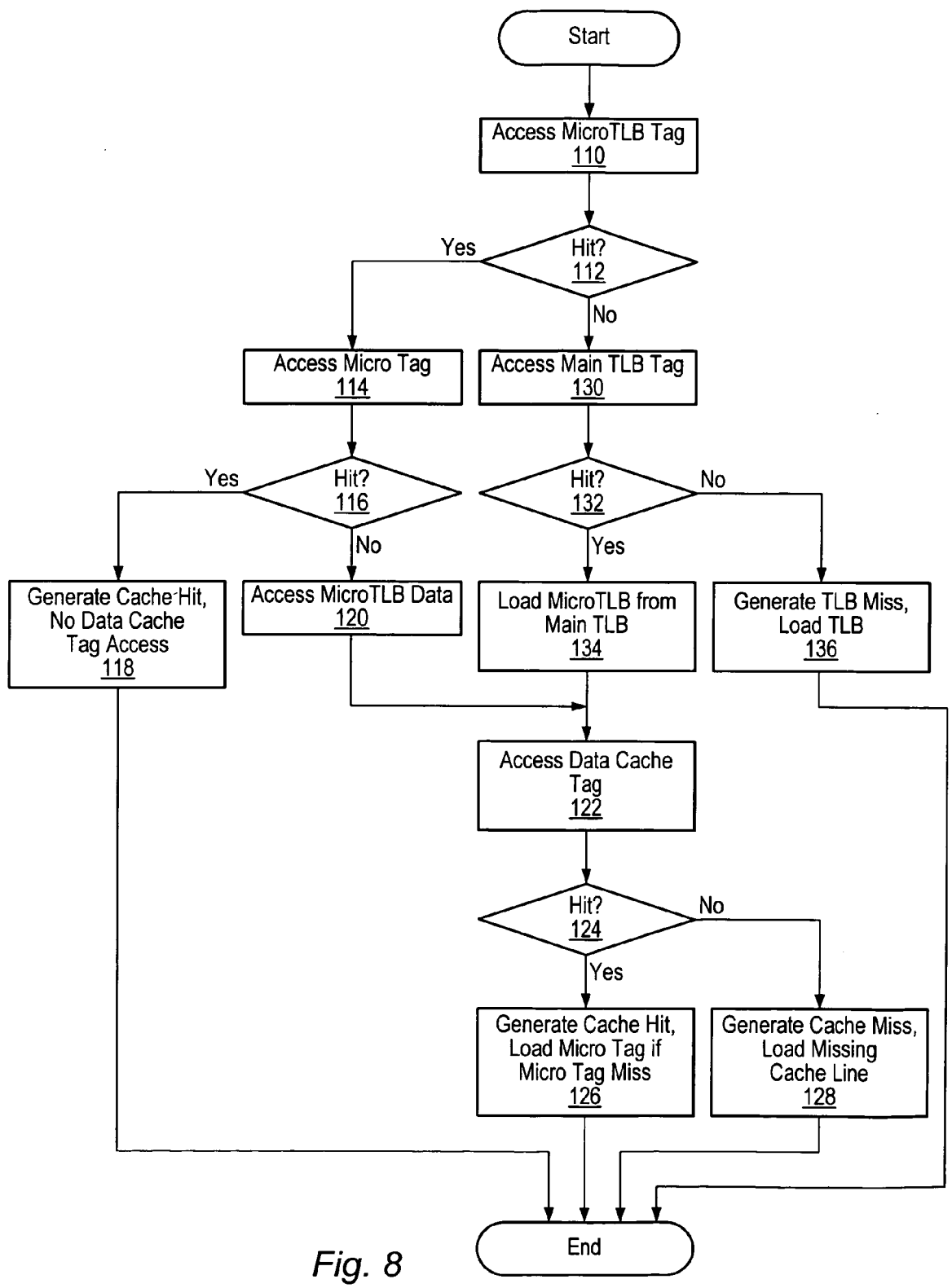
FIG. 8 is a flowchart illustrating operation of one embodiment of the blocks shown in FIG. 2.

Turning now to FIG. 8, a flowchart is shown illustrating exemplary operation of one embodiment of the blocks shown in FIG. 2 in response to a virtual address from an AGU 12. While the blocks in FIG. 8 are shown in a particular order for ease of understanding, any order may be used. Blocks may be performed in parallel via combinatorial logic circuitry, or may be performed over two or more clock cycles in a pipelined fashion, as desired.

In response to the virtual address, the MicroTLB tag circuit 32 is accessed (block 110). If a MicroTLB hit is detected (decision block 112, "yes" leg), the micro tag circuit 36 is accessed (block 114). If a hit in the micro tag is detected (decision block 116, "yes" leg), the cache hit/miss circuit 50 may indicate a cache hit (e.g. the cache miss indication may not indicate miss) and the data cache tag memory 22 may not be accessed in response to the virtual address (block 118). If a hit in the micro tag is not detected (decision block 116, "no" leg), the microTLB data circuit 34 may be accessed (block 120). In some embodiments, the microTLB data circuit 34 may be accessed in response to a microTLB tag hit, independent of whether or not the micro tag is a hit. The data cache tag memory 22 is also accessed (block 122). If a hit is detected between a tag from the data cache tag memory 22 and the physical address from the microTLB data circuit 34 (decision block 124, "yes" leg), the cache hit/miss circuit 50 may indicate a cache hit (block 126). Additionally, since a micro tag miss was detected in this case, the micro tag may be loaded with the hitting tag. If a miss is detected between a tag from the data cache tag memory 22 and the physical address from the microTLB data circuit 34 (decision block 124, "no" leg), the cache hit/miss circuit 50 may indicate a cache miss (block 128) and the missing cache line may be loaded into the data cache 16 (and optionally the micro tag circuit 36 may be updated with the tag of the missing cache line as well).

If a MicroTLB miss is detected (decision block 112, "no" leg), the main TLB tag circuit 40 may be accessed (block 130). If a hit in the main TLB is detected (decision block 132, "yes" leg), the microTLB is loaded from the main TLB (block 134) and the micro tag entries corresponding to the microTLB entry that is loaded may be invalidated. Additionally, blocks 122, 124, 126, and 128 are repeated for the tag comparison with the physical address from the main TLB. However, at block 126, the micro tag may optionally not be loaded if desired. On the other hand, if a miss in the main TLB is detected (decision block 132, "no" leg), the main TLB 38 may generate a TLB miss, and the main TLB may be loaded with the missing translation (or an exception may occur if no translation is found) (block 136). Optionally, the microTLB may be loaded in the event of a main TLB miss as well, and the micro tag may be updated to invalidate micro tag entries corresponding to the microTLB entry that is loaded.

It is noted that, while the above description refers to comparing the physical address from the microTLB 30 or the main TLB 38 to the tag from the data cache tag memory 22, the TLBs may generally output the page portion of the physical address. The remainder of the cache tag for comparison may be formed by concatenating the page portion of the physical address with the page offset portion of the virtual address.

Figure 9:
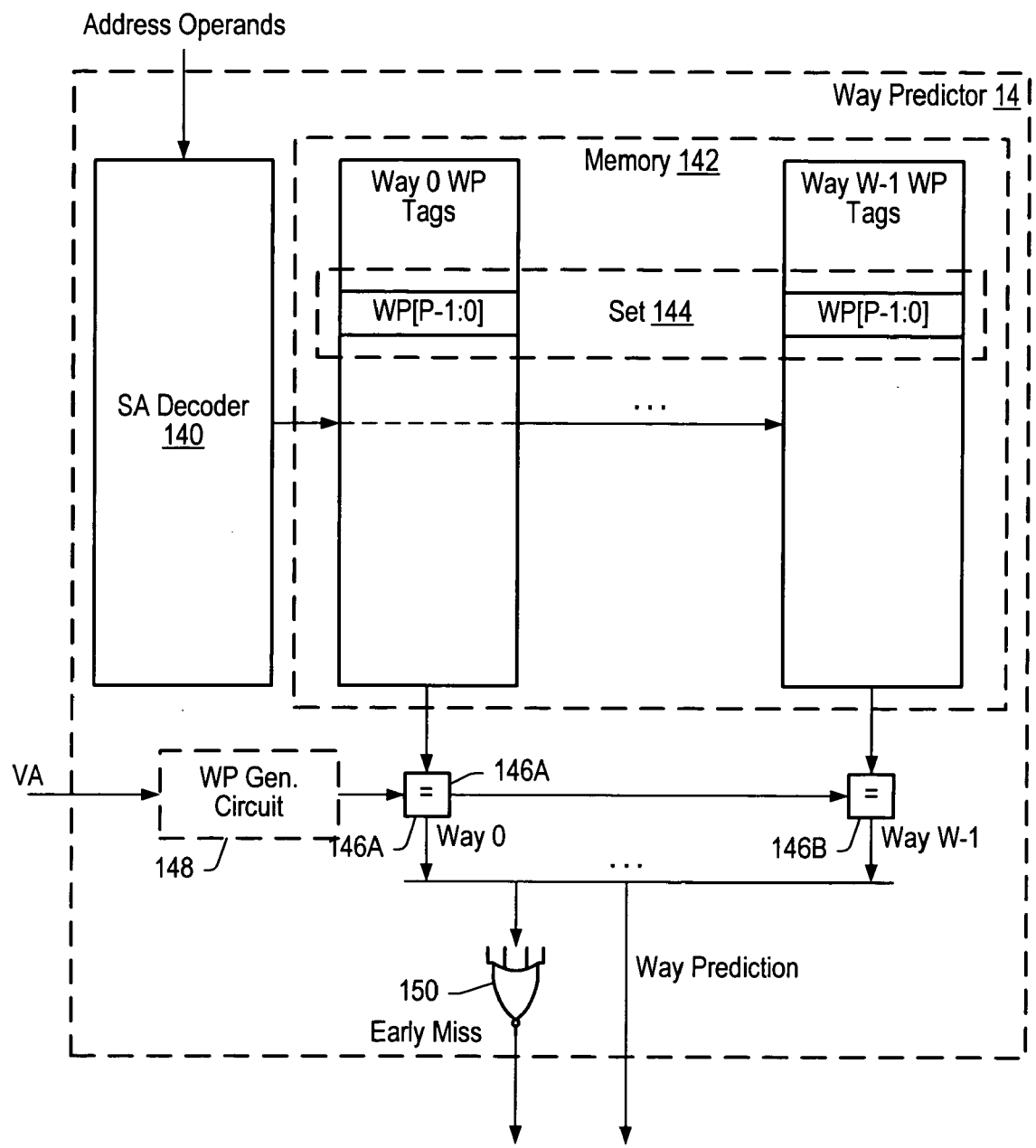
FIG. 9 is a block diagram of one embodiment of a way predictor shown in FIG. 1.

Turning next to FIG. 9, a block diagram of one embodiment of the way predictor 14 is shown. In the illustrated embodiment, the way predictor 14 includes a sum address (SA) decoder 140 coupled to receive one or more address operands corresponding to the virtual address for which a way prediction is to be made, and further coupled to a memory 142. The SA decoder 140 may implement sum-address indexing, described in more detail below. The memory 142 may be W-way set associative (the same as the data cache 16) and thus may have a plurality of entries arranged as ways 0 through way W−1. Each entry of the memory 142 stores way prediction value comprising P bits (WP[−1:0]). A plurality of comparators including comparators 146A–146B are coupled to the memory 142. A comparator 146A–146B may be included for each way of the way predictor 14. The comparators 146A–146B are coupled to receive either a portion of the virtual address (VA) from the AGU 12 or the output of an optional way prediction generation circuit 148 (or, in another option, a portion of the address operands). The outputs of the comparators 146A–146B may form the way prediction output of the way predictor 14. Additionally, if none of the comparators 146A–146B detect a match, the way predictor 14 may output the early miss signal (illustrated as a NOR gate 150 receiving the outputs of the comparators 146A–146B in FIG. 9).

The decoder 140 is configured to decode the address operands (using sum-address decoding in this embodiment) to select a set 144 of the memory 142, and the memory 142 is configured to output the contents of the set 144 to the comparators 146A–146B. Each of the comparators 146A–146B compares the way prediction value from the respective way of the memory 142 to a way prediction value corresponding to the input virtual address. If a match is detected, the way predictor 14 predicts that the corresponding way is a hit in the data cache 16. In the illustrated embodiment, the way prediction may comprise a one-hot encoding for the ways, with a bit asserted for the predicted way. If none of the way prediction bits match the input way prediction bits, then no way prediction is generated (and the early miss signal may be asserted). Other embodiments may encode the way prediction in other ways, and the way predictor 14 may include circuitry coupled to receive the output of the comparators 146A–146B and configured to generate the way prediction encoding.

The way prediction value may be generated in any fashion, as desired, and may include any number of bits (e.g. P may be any integer greater than one). The way prediction values stored in the way predictor 14 are generated according to the corresponding cache lines in the data cache 16. For example, in one embodiment, the way prediction value may be a partial tag of the virtual address corresponding to the cache line stored at the same index and way in the data cache 16. That is, the way prediction value may comprise a concatenation of selected virtual address bits (excluding at least one address bit that is part of the cache tag). It may be desirable, for such an embodiment, to select virtual address bits that vary the most frequently (or, viewed in another way, show the most randomness among consecutive accesses). For example, the least significant address bits that are still part of the cache tag (not part of the cache line offset) may be selected. For such an embodiment, the way prediction generation circuit 148 may not be used and the selected virtual address bits from the input virtual address may be coupled as inputs to the comparators 146A–146B. In another embodiment, one or more of the way prediction value bits may be generated as a logical combination of two or more virtual address bits. In such an embodiment, frequently changing virtual address bits may be combined with less frequently changing virtual address bits, for example. In one embodiment, the logical combination may comprise exclusive OR. For such an embodiment, the logical combination may be performed on the virtual address bits by the way predictor generation circuit 148, the output of which may be coupled to the comparators 146A–146B. In yet another embodiment, bits may be selected from the address operands prior to the addition to generate the virtual address. The bits may be logically combined using the way predictor generation circuit 148, or may be concatenated, similar to the virtual address examples given above.

To avoid the situation in which two or more entries have the same way prediction value (and thus a match on more than one way would occur in the way predictor 14), the replacement of cache lines in the data cache 16 may be controlled to ensure that the way prediction values in a given set of the way predictor 14 remain unique. An example of such a procedure is shown in the flow chart of FIG. 10. It may be desirable to include enough bits in the way prediction values that the above replacement strategy does not frequently cause premature replacement of cache lines to maintain the uniqueness of the way prediction values. For example, if concatenation of virtual address bits is used to generate the way prediction values, about 7 bits of way prediction value may be selected.

In some embodiments, due to the relatively small size of the way predictor 14 as compared to the data cache tag memory 22, the way predictor 14 may be included in the data path of the AGU (which may reduce the distance that the virtual address travels to reach the desired circuitry).

As mentioned above, the decoder 140 may use sum-address decoding to decode the address operands and select a set 144 that corresponds to the virtual address. Other embodiments may use a conventional decoder that is coupled to receive the virtual address. Thus, in general, the decoder 140 may receive an indication of the address that is to access the cache. The indication may include the address operands used to form the virtual address, in some embodiments, or may include the virtual address itself, in other embodiments.

Sum-address decoding receives the address operands used to generate an address, and correctly selects the same set of a memory as would be selected if the address itself were decoded. Generally, sum-address decoding relies on the principle that the test A+B=K may be evaluated more quickly for a constant K than adding A and B and comparing the sum to K. In the context of decoding, the constant K is the value of A+B that would select a given set. The circuitry that generates the word line for the set assumes the constant K for that set. An overview of sum-address decoding is provided next.

If A is represented as a bit vector $a_{n-1}a_{n-2} \ldots a_0$, B is represented as a bit vector $b_{n-1}b_{n-2} \ldots b_0$, and K is represented as a bit vector $k_{n-1}k_{n-2} \ldots k_0$, it can be shown that, if A+B=K, then the carry out of a given bit position i−1 of the addition A+B ($Cout_{i-1}$) and the carry in to the subsequent bit position i ($Cin_i$) may be given by equations 1 and 2 below (where "!" represents inversion, "XOR" represents exclusive OR, "&" represents AND, and "|" represents OR):

$$Cout_{i-1} = ((a_{i-1} \text{ XOR } b_{i-1}) \text{ \& } !k_{i-1})|(a_{i-1} \text{ \& } b_{i-1}) \quad (1)$$

$$Cin_i = k_i \text{ XOR } a_i \text{ XOR } b_i \quad (2)$$

If A+B=K, $Cout_{i-1}$ equals $Cin_i$ for all i (ranging from 0 to n−1). That is, the term $e_i$ as set forth in equation 3 below is 1 for all i if A+B=K.

$$e_i = Cin_i \text{ XOR } !Cout_{i-1} \quad (3)$$

To generate equations of $e_i$ that may be used in the decoder 140, it is desirable to generate terms that are not dependent on K (which each of equations 1 and 2, and therefore equation 3, are dependent). Particularly, equation 3 depends on $k_i$ (through $Cin_i$) and $k_{i-1}$ (through $Cout_{i-1}$). Thus, four $e_i$ terms may be generated for each bit position i. Each $e_i$ term may assume one set of values for $k_i$ and $k_{i-1}$. These terms are noted as $e_i^{k_ik_{i-1}}$, where $k_i$ and $k_{i-1}$ are substituted in the notation with the assumed value for each bit (e.g. $e_i^{01}$ corresponds to assuming $k_i=0$ and $k_{i-1}=1$). Equations 4–7 illustrate the 4 $e_i$ terms for each bit position. Each of equations 4–7 are formed by substituting equations 1 and 2 into equation 3, providing the assumed value for $k_i$ and $k_{i-1}$, and reducing the terms using Boolean algebra.

$$e_i^{00} = a_i \text{ XOR } b_i \text{ XOR } !(a_{i-1}|b_{i-1}) \quad (4)$$

$$e_i^{01} = a_i \text{ XOR } b_i \text{ XOR } !(a_{i-1} \text{ \& } b_{i-1}) \quad (5)$$

$$e_i^{10} = !(a_i \text{ XOR } b_i) \text{ XOR } !(a_{i-1}|b_{i-1}) \quad (6)$$

$$e_i^{00} = !(a_i \text{ XOR } b_i) \text{ XOR } !(a_{i-1} \text{ \& } b_{i-1}) \quad (7)$$

Additionally, for the bit position 0 of the index, the carry in term ($c_{-1}$) replaces the i−1 terms to form equations 8 and 9:

$$e_0^{0c} = a_i \text{ XOR } b_i \text{ XOR } !c_1 \quad (8)$$

$$e_0^{1c} = !(a_i \text{ XOR } b_i) \text{ XOR } !c_{-1} \quad (9)$$

The above equations may be implemented in logic for each bit position of the index into the way prediction memory 142, with the carry in $c_{-1}$ equal to the carry in from the cache line offset addition. This carry in may be provided, e.g. by the AGU 12 from the virtual address addition. The carry in may arrive late, and may select between banks that have even and odd indexes in them, for example.

To generate the word line for a given set, one of $e_i^{00}$, $e_i^{01}$, $e_i^{10}$, and $e_i^{11}$ for each bit position is selected (based on the value of the index corresponding to the word line being generated) and the selected values are logically ANDed to generate the word line. For example, the word line for index zero may be the logical AND of $e_i^{00}$ for each bit position and $e_0^{0c}$. The word line for index 1 ($k_0=1$, all other $k_i=0$) may be the logical AND of $e_i^{00}$ for each i between 2 and n−1, $e_1^{01}$ and $e_0^{1c}$. The word line for index 2 ($k_1=1$, all other $k_i=0$) may be the logical AND of $e_i^{00}$ for each i between 3 and n−1, $e_2^{01}$, $e_1^{10}$, and $e_0^{0c}$. The word line for index 3 ($k_1$ and $k_0=1$, all other $k_i=0$) may be the logical AND of $e_i^{00}$ for each i between 3 and n−1, $e_2^{01}$, $e_1^{11}$, and $e_0^{1c}$. Additional word lines for other indexes may similarly be selected.

Additional details regarding one embodiment of sum address decoding may be found in the article by William L. Lynch, Gary Lauterbach, and Joseph I. Chamdani "Low Load Latency through Sum-Addressed Memory (SAM)", *Proceedings of the 25th Annual International Symposium on Computer Architecture*, 1998, pages 369–379. This article is incorporated herein by reference in its entirety.

Figure 11:
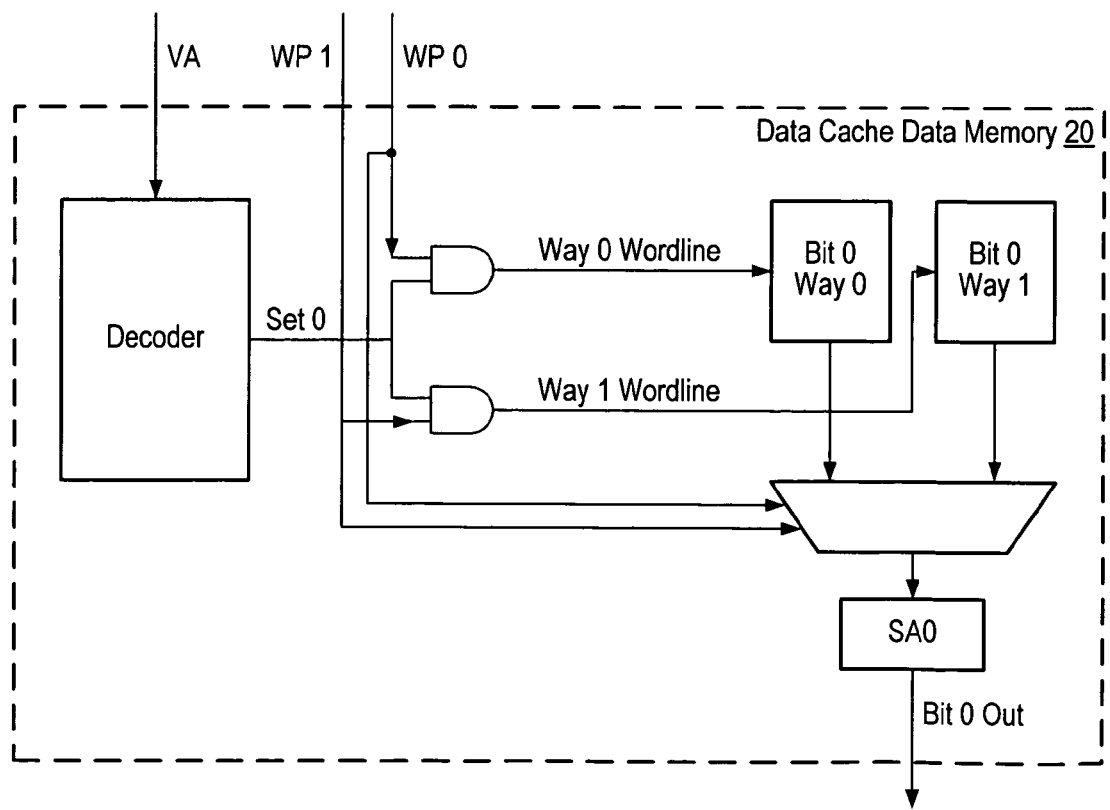
FIG. 11 is a block diagram of one embodiment of a portion of the data cache data memory shown in FIG. 1.

The way predictor 14 may be used to reduce the power consumption of the processor 10 by permitting reduced consumption in the data cache data memory 20. For example, in some embodiments, the data cache data memory 20 may comprise a random access memory (RAM). Locations in the RAM may be enabled by activating a word line. The enabled locations may discharge certain bit lines attached to the location, providing a differential on pairs of bit lines that represents each bit in the location. The pairs of bit lines may be input to sense amplifiers (sense amps) which may convert the differentials to output bits. In some implementations, the data cache data memory 20 RAM may provide separate word line signals to each way in the data cache data memory 20. The virtual address may be decoded to provide a set selection, and the set selection may be qualified with the way prediction to generate the word line for each way. Thus, the predicted way may be enabled and other ways may not be enabled, reducing the power consumed in the bit line discharge that would otherwise have occurred in the non-enabled ways. Bit line power consumption may often be one of the most significant factors (and may be the most significant factor) in the power consumption of such a memory. An example of a portion of such an embodiment of the data cache data memory 20 is shown in FIG. 11, in which the virtual address (VA) is received by a decoder, which generates a set selection (e.g. Set 0 in FIG. 11 and other sets, not shown in FIG. 11). AND gates receive an indication that way 0 is predicted (WP0) or way 1 is predicted (WP1), and corresponding way word lines are generated for way 0 and way 1. Bit 0 of each way is shown in FIG. 11, receiving the corresponding way word line. Bit 0 from each way is column-muxed by a mux controlled by the way predictions as well (to select the bit 0 from the predicted way), and a sense amp (SA0) sense bit 0 from the predicted way and drives bit 0 out of the data cache data memory 20. Other bits may be treated similarly, and additional ways may be provided by providing additional AND gates and way predictions.

Figure 12:
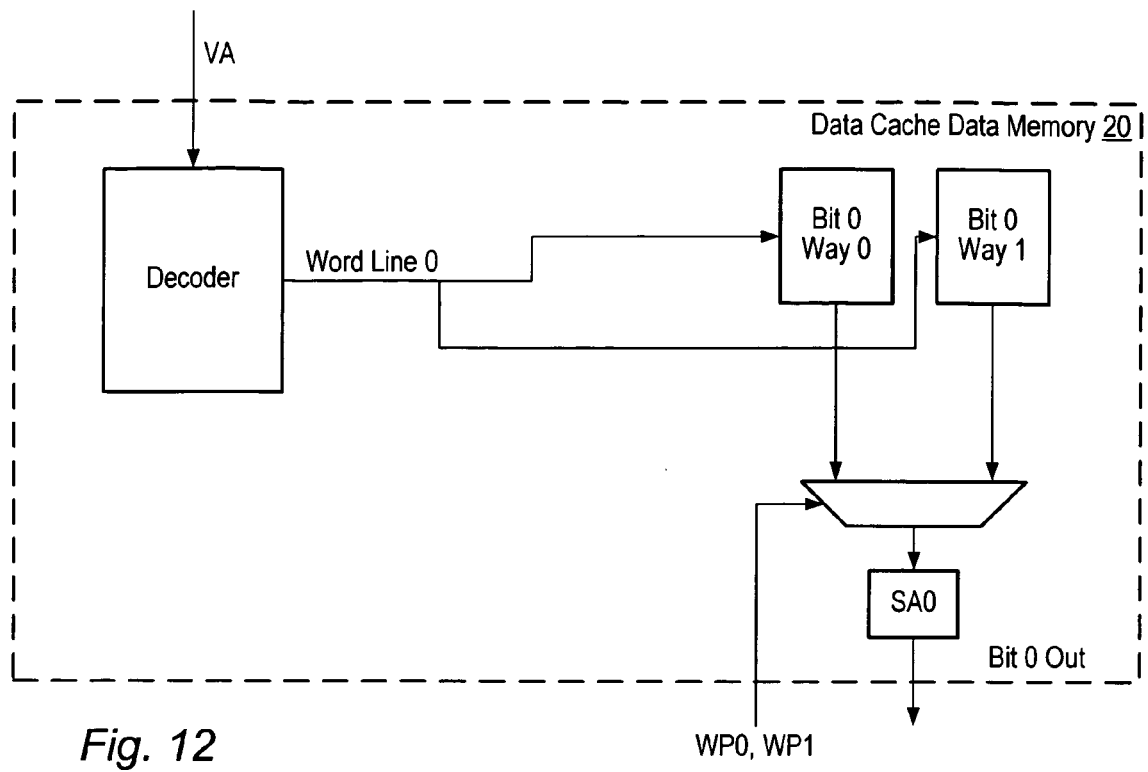
FIG. 12 is a block diagram of a second embodiment of a portion of the data cache data memory shown in FIG. 1.

In other embodiments, the way prediction may not be available early enough to provide selective word line generation. For such embodiments, the word lines to each way may be driven based on decoding the address, and the bit line discharge may occur in each way. In some implementations, the bits from each way may be physically interleaved and column-muxed into the sense amps. That is, bit 0 of each way may physically be located adjacent to each other, and the mux may select bit 0 from the selected way into the input of the sense amp for bit 0 of the output. Other output bits may be similarly selected. The way prediction may be used to provide selection control to the column mux, and thus the number of sense amps may be the number of bits output from a way (rather than the number of bits output from a way multiplied by the number of ways). Power consumed in the sense amps and driving data out of the sense amps may be reduced as compared to having separate sense amps for each way. Sense amp drive out power may often be one of the most significant factors (and may be the most significant factor other than bit line power consumption) in the power consumption of such a memory. An example of a portion of such an embodiment is shown in FIG. 12. The decoder (similar to the decoder in FIG. 11) decodes the input virtual address (VA) to generate word lines (e.g. word line 0 in FIG. 12 an other word lines for other sets, not shown in FIG. 12). Bit 0 from ways 0 and 1 are shown, and each bit discharges its bit lines responsive to the word line assertion. The mux in FIG. 12 is controlled by the way predictions to select bit 0 from the predicted way into the sense amp for bit 0 (SA0 in FIG. 12). Other bits read from the predicted way may be treated similarly, and additional ways may be handled in a similar manner.

Figure 13:
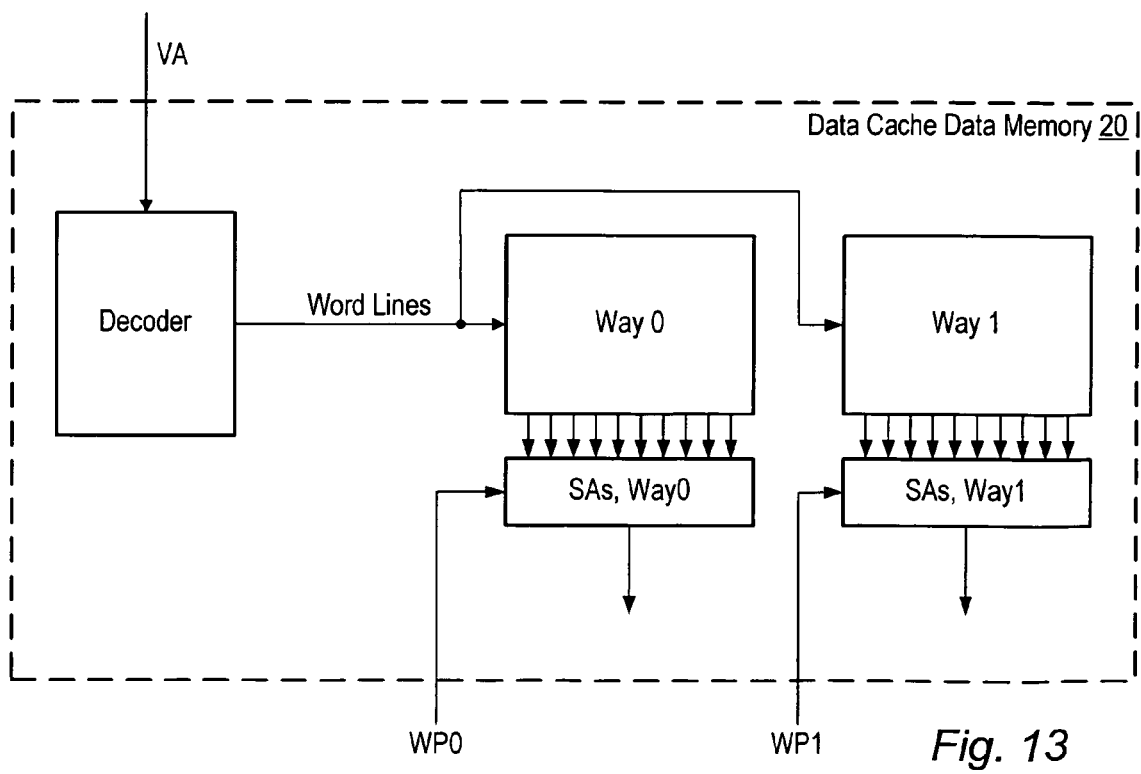
FIG. 13 is a block diagram of a third embodiment of a portion of the data cache data memory shown in FIG. 1.

In other implementations, separate sense amps may be provided for each way, but the sense amps may have an enable input to enable operation. The way prediction may be used to enable only the sense amps in the predicted way for such implementations, and power consumed in the sense amps and driving data out of the sense amps may be reduced similar to using the column-muxing technique. FIG. 13 is an example of such an embodiment of the data cache data memory 20. Again, the decoder may decode the input virtual address (VA) and generate word lines, which are provided to the way 0 and way 1 storage. Each way outputs a number of bit lines to a set of sense amps for the way. Each set of sense amps receives an enable controlled by the way prediction for that way (WP0 and WP1 for ways 0 and 1, respectively). The data cache data memory 20 in this embodiment may also include a mux to select the predicted way from the outputs of the sense amps.

In yet other embodiments, it may be possible to only drive the input virtual address to the way that is predicted, reducing power by not driving the address to the unpredicted ways.

Figure 10:
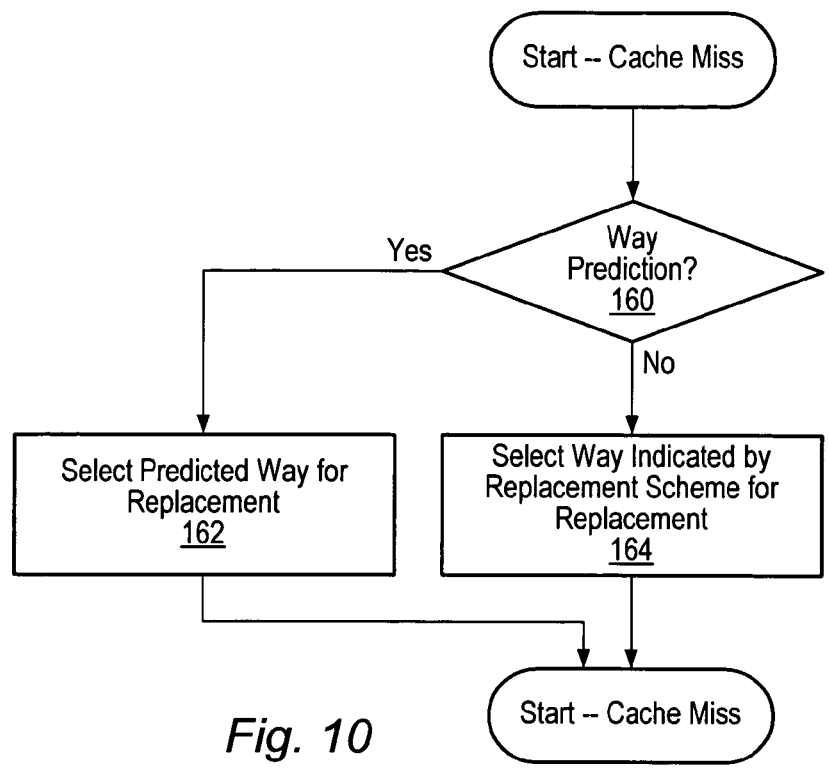
FIG. 10 is a flowchart illustrating one embodiment of selecting a replacement way in response to a cache miss.

Turning now to FIG. 10, a flowchart is shown illustrating a replacement mechanism that may be employed by the data cache 16 in response to a cache miss. While the blocks in FIG. 10 are shown in a particular order for ease of understanding, any order may be used. Blocks may be performed in parallel via combinatorial logic circuitry, or may be performed over two or more clock cycles in a pipelined fashion, as desired.

If the way predictor 14 made a way prediction for the virtual address that resulted in the cache miss (decision block 160), then the predicted way is selected for replacement (block 162). Otherwise, the way to replace is selected according to the replacement scheme implemented by the cache (block 164). Any replacement algorithm may be used (e.g. LRU, pseudo-LRU, random, etc.).

The above algorithm forces a cache block that misses in the cache but which matches a current way prediction value in the way predictor 14 to replace the cache line corresponding to that way prediction value. Thus, the same way prediction value may not be stored in more than one location in a set.

Figure 14:
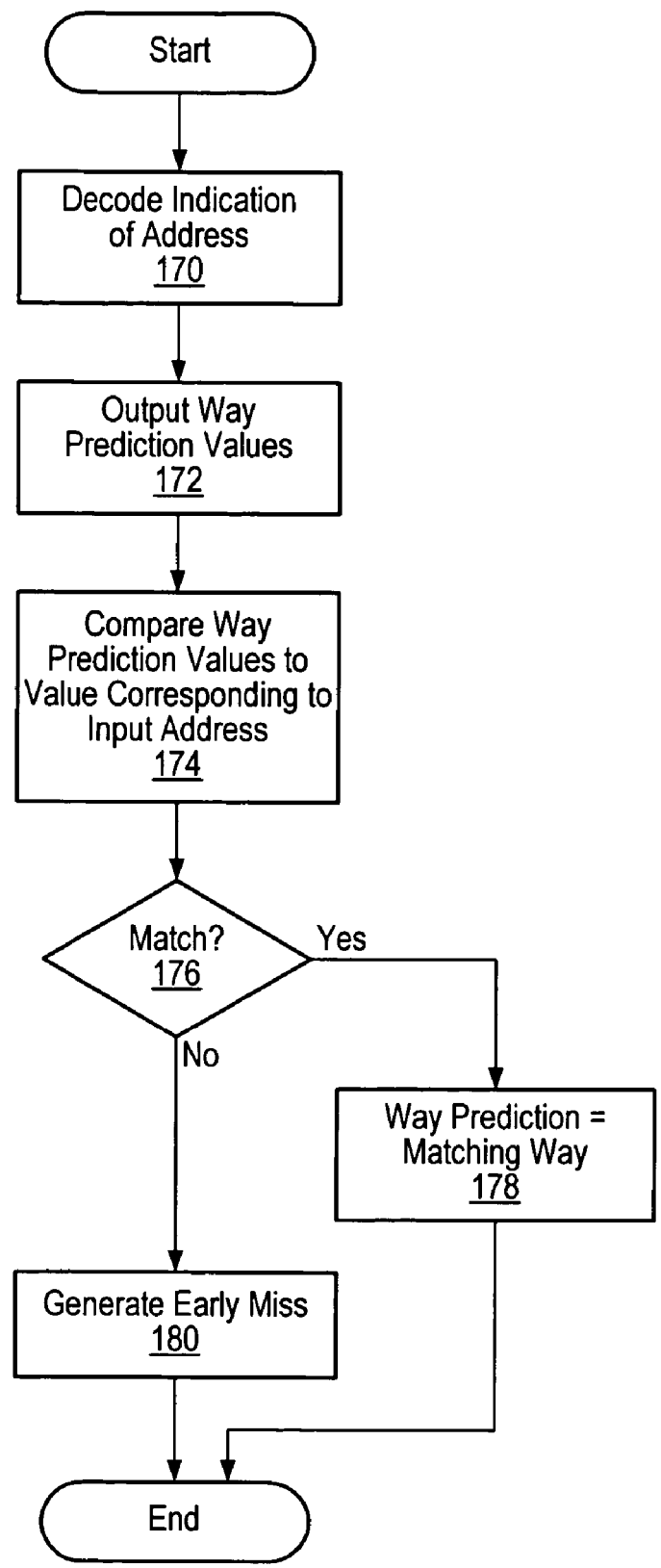
FIG. 14 is a flowchart illustrating one embodiment of generating a way prediction.

FIG. 14 is a flowchart illustrating forming a way prediction according to one embodiment of the way predictor 14. While the blocks in FIG. 14 are shown in a particular order for ease of understanding, any order may be used. Blocks may be performed in parallel via combinatorial logic circuitry, or may be performed over two or more clock cycles in a pipelined fashion, as desired.

The way predictor 14 may decode the indication of the address (e.g. address operands, or the address itself, in some embodiments) (block 170). The way predictor 14 may output a plurality of way prediction values from the set indicated by the decoding (block 172). The output way prediction values may be compared to a value corresponding to the input address decoded at block 170 (block 174). If the comparison results in a may (decision block 176, "yes" leg), the way prediction may be generated equal to the way for which the match is detected (block 178). Otherwise (decision block 176, "no" leg), no way prediction may be generated and the way predictor 14 may generate the early miss indication (block 180). Together, blocks 176, 178, and 180 may comprise one embodiment of generating a way prediction.

Computer Systems

Figure 15:
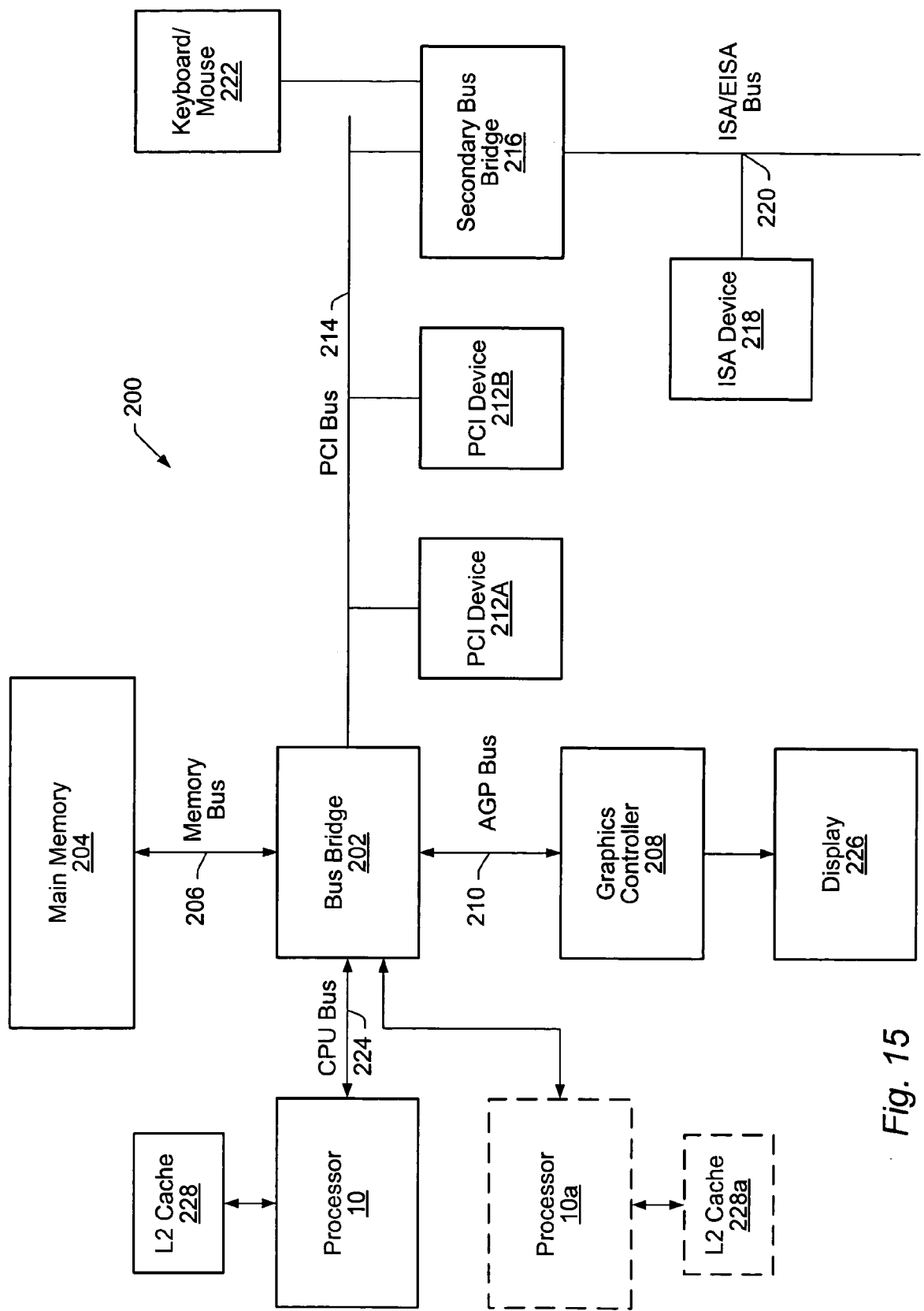
FIG. 15 is a block diagram of one embodiment of a computer system including the processor shown in FIG. 1.

Turning now to FIG. 15, a block diagram of one embodiment of a computer system 200 including processor 10 coupled to a variety of system components through a bus bridge 202 is shown. In the depicted system, a main memory 204 is coupled to bus bridge 202 through a memory bus 206, and a graphics controller 208 is coupled to bus bridge 202 through an AGP bus 210. Finally, a plurality of PCI devices 212A–212B are coupled to bus bridge 202 through a PCI bus 214. A secondary bus bridge 216 may further be provided to accommodate an electrical interface to one or more EISA or ISA devices 218 through an EISA/ISA bus 220. Processor 10 is coupled to bus bridge 202 through a CPU bus 224 and to an optional L2 cache 228. Together, CPU bus 224 and the interface to L2 cache 228 may comprise an external interface to which external interface unit 18 may couple. The processor 10 may be the processor 10 shown in FIG. 1, and may include the structural and operational details shown in FIGS. 2–14.

Bus bridge 202 provides an interface between processor 10, main memory 204, graphics controller 208, and devices attached to PCI bus 214. When an operation is received from one of the devices connected to bus bridge 202, bus bridge 202 identifies the target of the operation (e.g. a particular device or, in the case of PCI bus 214, that the target is on PCI bus 214). Bus bridge 202 routes the operation to the targeted device. Bus bridge 202 generally translates an operation from the protocol used by the source device or bus to the protocol used by the target device or bus.

In addition to providing an interface to an ISA/EISA bus for PCI bus 214, secondary bus bridge 216 may further incorporate additional functionality, as desired. An input/output controller (not shown), either external from or integrated with secondary bus bridge 216, may also be included within computer system 200 to provide operational support for a keyboard and mouse 222 and for various serial and parallel ports, as desired. An external cache unit (not shown) may further be coupled to CPU bus 224 between processor 10 and bus bridge 202 in other embodiments. Alternatively, the external cache may be coupled to bus bridge 202 and cache control logic for the external cache may be integrated into bus bridge 202. L2 cache 228 is further shown in a backside configuration to processor 10. It is noted that L2 cache 228 may be separate from processor 10, integrated into a cartridge (e.g. slot 1 or slot A) with processor 10, or even integrated onto a semiconductor substrate with processor 10.

Main memory 204 is a memory in which application programs are stored and from which processor 10 primarily executes. A suitable main memory 204 comprises DRAM (Dynamic Random Access Memory). For example, a plurality of banks of SDRAM (Synchronous DRAM), double data rate (DDR) SDRAM, or Rambus DRAM (RDRAM) may be suitable. Main memory 204 may include the system memory 42 shown in FIG. 1.

PCI devices 212A–212B are illustrative of a variety of peripheral devices. The peripheral devices may include devices for communicating with another computer system to which the devices may be coupled (e.g. network interface cards, modems, etc.). Additionally, peripheral devices may include other devices, such as, for example, video accelerators, audio cards, hard or floppy disk drives or drive controllers, SCSI (Small Computer Systems Interface) adapters and telephony cards. Similarly, ISA device 218 is illustrative of various types of peripheral devices, such as a modem, a sound card, and a variety of data acquisition cards such as GPIB or field bus interface cards.

Graphics controller 208 is provided to control the rendering of text and images on a display 226. Graphics controller 208 may embody a typical graphics accelerator generally known in the art to render three-dimensional data structures which can be effectively shifted into and from main memory 204. Graphics controller 208 may therefore be a master of AGP bus 210 in that it can request and receive access to a target interface within bus bridge 202 to thereby obtain access to main memory 204. A dedicated graphics bus accommodates rapid retrieval of data from main memory 204. For certain operations, graphics controller 208 may further be configured to generate PCI protocol transactions on AGP bus 210. The AGP interface of bus bridge 202 may thus include functionality to support both AGP protocol transactions as well as PCI protocol target and initiator transactions. Display 226 is any electronic display upon which an image or text can be presented. A suitable display 226 includes a cathode ray tube ("CRT"), a liquid crystal display ("LCD"), etc.

It is noted that, while the AGP, PCI, and ISA or EISA buses have been used as examples in the above description, any bus architectures may be substituted as desired. It is further noted that computer system 200 may be a multiprocessing computer system including additional processors (e.g. processor 10a shown as an optional component of computer system 200). Processor 10a may be similar to processor 10. More particularly, processor 10a may be an identical copy of processor 10. Processor 10a may be connected to bus bridge 202 via an independent bus (as shown in FIG. 15) or may share CPU bus 224 with processor 10. Furthermore, processor 10a may be coupled to an optional L2 cache 228a similar to L2 cache 228.

Figure 16:
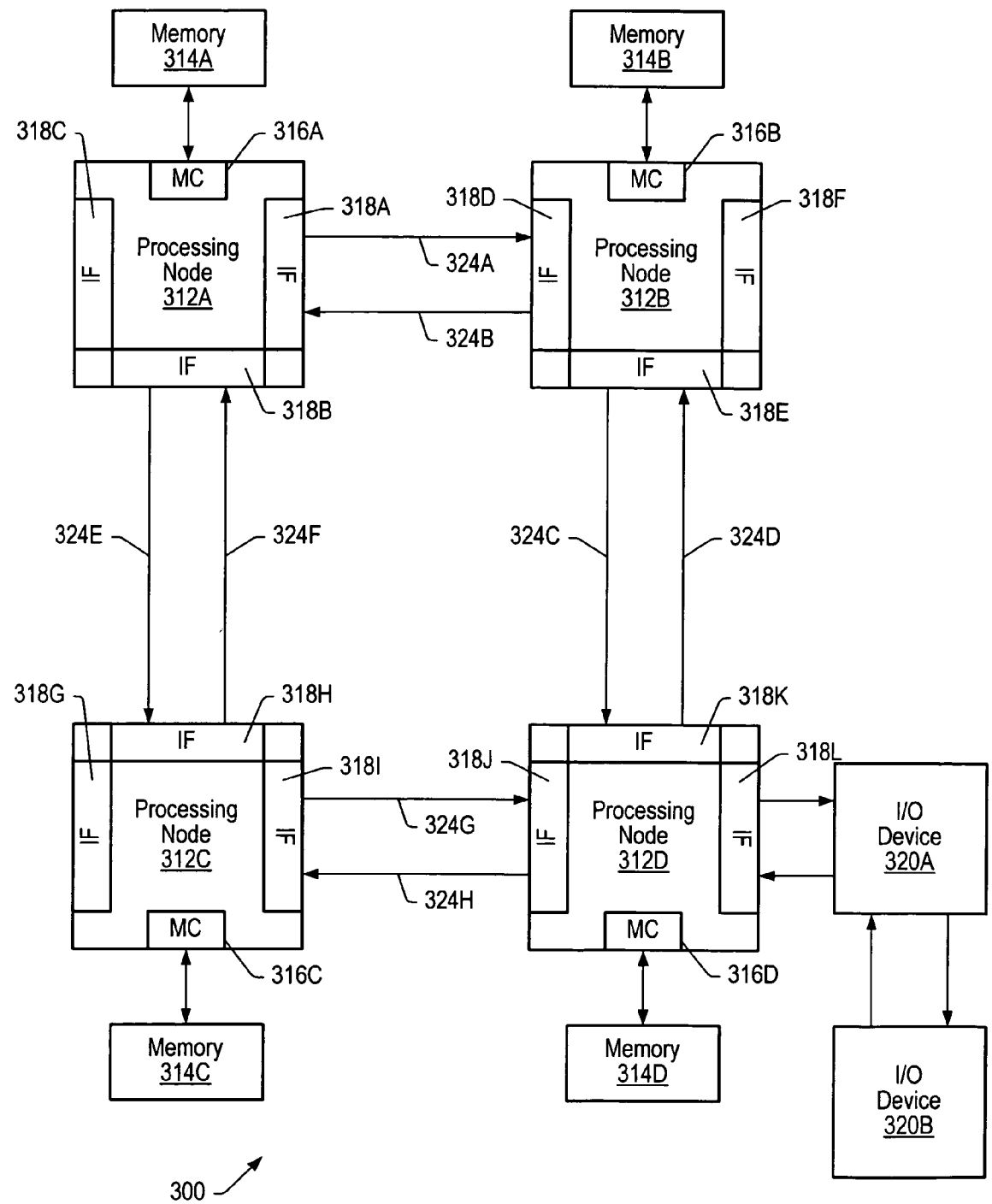
FIG. 16 is a block diagram of a second embodiment of a computer system including the processor shown in FIG. 1.

Turning now to FIG. 16, another embodiment of a computer system 300 is shown. In the embodiment of FIG. 16, computer system 300 includes several processing nodes 312A, 312B, 312C, and 312D. Each processing node is coupled to a respective memory 314A–314D via a memory controller 316A–316D included within each respective processing node 312A–312D. Additionally, processing nodes 312A–312D include interface logic used to communicate between the processing nodes 312A–312D. For example, processing node 312A includes interface logic 318A for communicating with processing node 312B, interface logic 318B for communicating with processing node 312C, and a third interface logic 318C for communicating with yet another processing node (not shown). Similarly, processing node 312B includes interface logic 318D, 318E, and 318F; processing node 312C includes interface logic 318G, 318H, and 318I; and processing node 312D includes interface logic 318J, 318K, and 318L. Processing node 312D is coupled to communicate with a plurality of input/output devices (e.g. devices 320A–320B in a daisy chain configuration) via interface logic 318L. Other processing nodes may communicate with other I/O devices in a similar fashion.

Processing nodes 312A–312D implement a packet-based link for inter-processing node communication. In the present embodiment, the link is implemented as sets of unidirectional lines (e.g. lines 324A are used to transmit packets from processing node 312A to processing node 312B and lines 324B are used to transmit packets from processing node 312B to processing node 312A). Other sets of lines 324C–324H are used to transmit packets between other processing nodes as illustrated in FIG. 16. Generally, each set of lines 324 may include one or more data lines, one or more clock lines corresponding to the data lines, and one or more control lines indicating the type of packet being conveyed. The link may be operated in a cache coherent fashion for communication between processing nodes or in a noncoherent fashion for communication between a processing node and an I/O device (or a bus bridge to an I/O bus of conventional construction such as the PCI bus or ISA bus). Furthermore, the link may be operated in a non-coherent fashion using a daisy-chain structure between I/O devices as shown. It is noted that a packet to be transmitted from one processing node to another may pass through one or more intermediate nodes. For example, a packet transmitted by processing node 312A to processing node 312D may pass through either processing node 312B or processing node 312C as shown in FIG. 16. Any suitable routing algorithm may be used. Other embodiments of computer system 300 may include more or fewer processing nodes then the embodiment shown in FIG. 16.

Generally, the packets may be transmitted as one or more bit times on the lines 324 between nodes. A bit time may be the rising or falling edge of the clock signal on the corresponding clock lines. The packets may include command packets for initiating transactions, probe packets for maintaining cache coherency, and response packets from responding to probes and commands.

Processing nodes 312A–312D, in addition to a memory controller and interface logic, may include one or more processors. Broadly speaking, a processing node comprises at least one processor and may optionally include a memory controller for communicating with a memory and other logic as desired. More particularly, each processing node 312A–312D may comprise one or more copies of processor 10 as shown in FIG. 1 (e.g. including various structural and operational details shown in FIGS. 2–14). External interface unit 18 may includes the interface logic 318 within the node, as well as the memory controller 316.

Memories 314A–314D may comprise any suitable memory devices. For example, a memory 314A–314D may comprise one or more RAMBUS DRAMs (RDRAMs), synchronous DRAMs (SDRAMs), DDR SDRAM, static RAM, etc. The address space of computer system 300 is divided among memories 314A–314D. Each processing node 312A–312D may include a memory map used to determine which addresses are mapped to which memories 314A–314D, and hence to which processing node 312A–312D a memory request for a particular address should be routed. In one embodiment, the coherency point for an address within computer system 300 is the memory controller 316A–316D coupled to the memory storing bytes corresponding to the address. In other words, the memory controller 316A–316D is responsible for ensuring that each memory access to the corresponding memory 314A–314D occurs in a cache coherent fashion. Memory controllers 316A–316D may comprise control circuitry for interfacing to memories 314A–314D. Additionally, memory controllers 316A–316D may include request queues for queuing memory requests.

Generally, interface logic 318A–318L may comprise a variety of buffers for receiving packets from the link and for buffering packets to be transmitted upon the link. Computer system 300 may employ any suitable flow control mechanism for transmitting packets. For example, in one embodiment, each interface logic 318 stores a count of the number of each type of buffer within the receiver at the other end of the link to which that interface logic is connected. The interface logic does not transmit a packet unless the receiving interface logic has a free buffer to store the packet. As a receiving buffer is freed by routing a packet onward, the receiving interface logic transmits a message to the sending interface logic to indicate that the buffer has been freed. Such a mechanism may be referred to as a "coupon-based" system.

I/O devices 320A–320B may be any suitable I/O devices. For example, I/O devices 320A–320B may include devices for communicating with another computer system to which the devices may be coupled (e.g. network interface cards or modems). Furthermore, I/O devices 320A–320B may include video accelerators, audio cards, hard or floppy disk drives or drive controllers, SCSI (Small Computer Systems Interface) adapters and telephony cards, sound cards, and a variety of data acquisition cards such as GPIB or field bus interface cards. It is noted that the term "I/O device" and the term "peripheral device" are intended to be synonymous herein.

Numerous variations and modifications will become apparent to those skilled in the art once the above disclosure is fully appreciated. It is intended that the following claims be interpreted to embrace all such variations and modifications.

What is claimed is:

1. A processor comprising:
a cache comprising a data memory configured to store a plurality of cache lines and a tag memory configured to store a plurality of tags, each of the plurality of tags corresponding to a respective one of the plurality of cache lines;
a first translation lookaside buffer (TLB) configured to store a plurality of page portions of virtual addresses identifying a plurality of virtual pages for which physical address translations are stored in the first TLB; and
a tag circuit coupled to the first TLB, the tag circuit configured to identify one or more of the plurality of cache lines that are stored in the cache and are within the plurality of virtual pages, the tag circuit configured to store an in-page portion of one or more virtual addresses corresponding to the one or more of the plurality of cache lines identified by the tag circuit, and the tag circuit configured to compare the in-page portion of the one or more virtual addresses to a corresponding in-page portion of the first virtual address to detect a hit;
wherein, in response to a hit by a first virtual address in the first TLB and the hit by the first virtual address in the tag circuit, the tag circuit is configured to prevent a read of the tag memory in the cache.

2. The processor as recited in claim 1 wherein, in response to the hit by the first virtual address in the first TLB and a miss by the first virtual address in the tag circuit, the cache is configured to read one or more tags stored in the tag memory and is configured to detect whether or not the first virtual address hits in the cache.

3. The processor as recited in claim 2 wherein the first TLB is configured to output a page portion of a first physical address corresponding to the first virtual address, and wherein the cache is coupled to receive a tag portion of the first physical address and is configured to compare the tag portion of the first physical address to the one or more tags from the tag memory to detect the hit in the cache.

4. The processor as recited in claim 2 wherein the tag circuit is configured to store at least a portion of a first tag in response to the first virtual address hitting in the tag memory, the first tag corresponding to the cache line hit by the first virtual address.

5. The processor as recited in claim 2 further comprising a second TLB, wherein the second TLB is accessed in response to a miss in the first TLB, and wherein the second TLB is configured to provide a page portion of a first physical address corresponding to the first virtual address in response to a hit in the second TLB, and wherein the cache is coupled to receive a tag portion of the first physical address and is configured to compare the tag portion of the first physical address to at least a first tag from the tag memory to detect the hit in the cache.

6. The processor as recited in claim 1 wherein the first TLB comprises a first plurality of entries, each of the first plurality of entries configured to store a respective page portion of the plurality of page portions of virtual addresses, and wherein the first TLB is configured to output an indication of a first entry of the first plurality of entries that is hit by the first virtual address.

7. The processor as recited in claim 6 wherein the tag circuit is coupled to receive the indication of the first entry, and wherein the tag circuit comprises a second plurality of entries, wherein a subset of the second plurality of entries corresponds to one of the first plurality of entries in the first TLB and identifies cache lines that are stored in the cache and that are within a page indicated by the page portion stored in the one of the first plurality of entries, and wherein the tag circuit is configured to check the subset for a hit in response to the indication of the first entry.

8. The processor as recited in claim 7 wherein the subset is predetermined.

9. The processor as recited in claim 7 wherein each of the second plurality of entries is configured to store virtual address bits that are not included in the page portion of the virtual address and that are not included in the cache line offset portion of the virtual address.

10. The processor as recited in claim 6 wherein the first TLB is divided into a tag portion and a data portion, and wherein the tag portion comprises the first plurality of entries, and wherein the data portion comprises a third plurality of entries configured to store the physical address translations.

11. The processor as recited in claim 10 wherein the third plurality of entries are accessed in response to a hit in the first plurality of entries, and wherein the third plurality of entries are accessed at a different pipeline stage in the processor than the first plurality of entries are accessed.

12. A method comprising:
  accessing, with a first virtual address, a first translation lookaside buffer (TLB) configured to store a plurality of page portions of virtual addresses identifying a plurality of virtual pages for which physical address translations are stored in the first TLB;
  in response to a hit by the first virtual address in the first TLB, accessing a tag circuit configured to identify a plurality of cache lines that are stored in a cache and are within the plurality of virtual pages, the tag circuit storing an in-page portion of one or more virtual addresses corresponding to the one or more of the plurality of cache lines identified by the tag circuit;
  detecting a hit by the first virtual address in the first TLB and the tag circuit, wherein detecting the hit in the tag circuit comprises comparing the in-page portion of the one or more virtual addresses to a corresponding in-page portion of the first virtual address; and
  in response to the hit by the first virtual address in the first TLB and the tag circuit, preventing a read of a tag memory in the cache.

13. The method as recited in claim 12 further comprising, in response to the hit by the first virtual address in the first TLB and a miss by the first virtual address in the tag circuit, reading one or more tags stored in the tag memory and detecting whether or not the first virtual address hits in the cache.

14. The method as recited in claim 13 further comprising:
  the first TLB outputting a page portion of a first physical address corresponding to the first virtual address; and
  the cache comparing a tag portion of the first physical address to the one or more tags from the tag memory to detect the hit in the cache.

15. The method as recited in claim 12 further comprising storing at least a portion of a first tag from the second tag memory into the first tag memory in response to the first virtual address hitting in the first tag memory, the first tag corresponding to the cache line hit by the first virtual address.

16. The method as recited in claim 12 further comprising:
  accessing a second TLB in response to a miss in the first TLB, wherein the second TLB is configured to provide a page portion of a first physical address corresponding to the first virtual address in response to a hit in the second TLB; and
  the cache comparing the first physical address to at least a first tag from the tag memory to detect the hit in the cache.

17. The method as recited in claim 12 wherein the first TLB comprises a first plurality of entries, each of the first plurality of entries configured to store a respective page portion of the plurality of page portions of virtual addresses, and wherein the first tag memory comprises a second plurality of entries, wherein a subset of the second plurality of entries corresponds to one of the first plurality of entries in the first TLB and identifies cache lines that are stored in the cache and that are within a page indicated by the page portion stored in the one of the first plurality of entries, the method further comprising:
  the first TLB outputting an indication of a first entry of the first plurality of entries that is hit by the first virtual address; and
  the tag circuit checking the subset corresponding to the first entry for a hit in response to the indication of the first entry.

18. The method as recited in claim 17 wherein the subset is predetermined.

19. The method as recited in claim 17 wherein each of the second plurality of entries is configured to store virtual address bits that are not included in the page portion of the virtual address and that are not included in the cache line offset portion of the virtual address.

20. A processor comprising:
  a cache comprising a data memory configured to store a plurality of cache lines and a tag memory configured to store a plurality of tags, each of the plurality of tags corresponding to a respective one of the plurality of cache lines; and
  a tag circuit configured to detect a hit in the cache by a first virtual address for a subset of the plurality of cache lines; and
  in response to a hit by the first virtual address in the tag circuit, the tag circuit is configured to prevent a read of the tag memory, and wherein the data memory is configured to output at least a portion of a first cache line corresponding to the first virtual address.

* * * * *